(12) United States Patent
Murata et al.

(10) Patent No.: US 12,362,680 B2
(45) Date of Patent: Jul. 15, 2025

(54) POWER CONVERSION DEVICE, AND CONTROL METHOD

(71) Applicant: OMRON Corporation, Kyoto (JP)

(72) Inventors: Aya Murata, Kyoto (JP); Takanori Ishii, Kyoto (JP); Takayoshi Tawaragi, Kyoto (JP)

(73) Assignee: OMRON CORPORATION, Kyoto (JP)

(*) Notice: Subject to any disclaimer, the term of this patent is extended or adjusted under 35 U.S.C. 154(b) by 122 days.

(21) Appl. No.: 18/262,671

(22) PCT Filed: Dec. 20, 2021

(86) PCT No.: PCT/JP2021/047138
§ 371 (c)(1),
(2) Date: Jul. 24, 2023

(87) PCT Pub. No.: WO2022/163212
PCT Pub. Date: Aug. 4, 2022

(65) Prior Publication Data
US 2024/0305215 A1 Sep. 12, 2024

(30) Foreign Application Priority Data
Feb. 1, 2021 (JP) .................. 2021-014260

(51) Int. Cl.
*H02M 7/483* (2007.01)
*H02M 1/00* (2006.01)
(Continued)

(52) U.S. Cl.
CPC ....... *H02M 7/4837* (2021.05); *H02M 1/0095* (2021.05); *H02M 1/123* (2021.05); *H02M 3/06* (2013.01); *H02M 7/487* (2013.01)

(58) Field of Classification Search
CPC ....... H02M 7/4837; H02M 7/487; H02M 3/06
See application file for complete search history.

(56) References Cited

U.S. PATENT DOCUMENTS 9,419,542 B2 *  8/2016  Ma ................... H02M 7/53871
9,906,166 B2     2/2018  Xu et al.
(Continued)

FOREIGN PATENT DOCUMENTS

CN    104601026 A    5/2015
JP    2012210066 A   10/2012
(Continued)

OTHER PUBLICATIONS

Extended European Search Report issued in European Appln. No. 21923215.4, mailed Nov. 11, 2024.
(Continued)

*Primary Examiner* — Gary A Nash
(74) *Attorney, Agent, or Firm* — ROSSI, KIMMS & McDOWELL LLP

(57) ABSTRACT

A power converter includes a DC capacitor circuit, a first capacitor circuit including a first flying capacitor, and a second capacitor circuit including a second flying capacitor. A controller increases or decreases a period for charging and discharging a first DC capacitor and a second DC capacitor based on a deviation of a detected voltage value of the first flying capacitor from a voltage command value and a deviation of a detected voltage value of the second flying capacitor from a voltage command value, and outputs AC power from a second output terminal connected to a node between a source terminal of a second switch and a drain terminal of a third switch in the first capacitor circuit and from a first output terminal connected to a node between a source terminal of a sixth switch and a drain terminal of a seventh switch in the second capacitor circuit.

14 Claims, 15 Drawing Sheets

(51) Int. Cl.
*H02M 1/12* (2006.01)
*H02M 3/06* (2006.01)
*H02M 7/487* (2007.01)

(56) References Cited

U.S. PATENT DOCUMENTS

| | | | |
|---|---|---|---|
| 2013/0176014 A1 | 7/2013 | Guan et al. | |
| 2014/0376287 A1* | 12/2014 | Narimani | H02M 3/07 363/60 |
| 2015/0155770 A1* | 6/2015 | Ying | H02M 1/08 307/52 |
| 2016/0352251 A1* | 12/2016 | Li | H02M 7/487 |
| 2017/0149336 A1* | 5/2017 | Kidera | H02M 7/5387 |
| 2019/0199235 A1* | 6/2019 | Liu | H02J 3/38 |
| 2019/0363644 A1 | 11/2019 | Li et al. | |

FOREIGN PATENT DOCUMENTS

| | | |
|---|---|---|
| JP | 2013533729 A | 8/2013 |
| JP | 2016046962 A | 4/2016 |
| JP | 2018182951 A | 11/2018 |
| JP | 2019057969 A | 4/2019 |
| JP | 2020089240 A | 6/2020 |

OTHER PUBLICATIONS

Wang et al. "Capacitor Voltage Balancing of a Five-Level ANPC Converter Using Phase-Shifted PWM". IEEE Transactions On Power Electronics. Mar. 2015: 1147-1156. Vol. 30, No. 3.
Teymour et al. "A Five Level Gird-Connected ANPC Inverter with a Novel Energy Transfer Strategy for Battery Energy Storage Systems". 2019 IEEE Enegy Conversion Congress and Exposition (ECCE), IEEE. Sep. 29, 2019: 983-989.
International Search Report issued in Intl. Appln. No. PCT/JP2021/047138 mailed Mar. 1, 2022. English translation provided.
Written Opinion issued in Intl. Appln. No. PCT/JP2021/047138 mailed Mar. 1, 2022. English translation provided.
Geyer et al. "Model Predictive Direct Torque Control of a Five-Level ANPC Converter Drive System". 2011 IEEE Energy Conversion Congress and Exposition. Nov. 1, 2011: 363-370.
Geyer et al. "Model Predictive Direct Torque Control of a Five-Level ANPC Converter Drive System". IEEE Transactions On Industry Applications. Sep./Oct. 2012: 1565-1575. vol. 48, No. 5.

* cited by examiner

|   | f c 1 | f c 2 | d c 1 | d c 2 |
|---|---|---|---|---|
| A | Charging | Discharging | Discharging | Charging |
| B | Discharging | Charging | Charging | Discharging |
| C | Discharging | Charging | Discharging | Charging |
| D | Charging | Discharging | Charging | Discharging |

When patterns A to D have same switching time, four voltages are constant.

Switching times differ due to parameter variations among components.

POWER CONVERSION DEVICE, AND CONTROL METHOD

FIELD

The present invention relates to a multilevel power converter including flying capacitors and to a control method.

BACKGROUND

Distributed power supply systems have been widespread in recent years. A distributed power supply system includes, for example, photovoltaic power generators, rechargeable batteries, or fuel cells, and operates together with the interconnected power grid. The distributed power supply system includes power conditioners (hereafter also referred to as power converters) that convert direct current (DC) power obtained with, for example, photovoltaic power generators, rechargeable batteries, or fuel cells to alternating current (AC) power before supplying power to loads and to the interconnected power grid. As such power converters, for example, Patent Literatures 1 and 2 describe multilevel power convertors that output voltages at multiple levels with flying capacitors.

CITATION LIST

Patent Literature

Patent Literature 1: Japanese Unexamined Patent Application Publication No. 2020-89240
Patent Literature 2: Japanese Unexamined Patent Application Publication No. 2019-57969

SUMMARY

Technical Problem

A multilevel power converter includes flying capacitors having constantly balanced voltages under an ideal condition in which the components of the circuit have no parameter variations. However, the components of the circuit with parameter variations can cause fluctuations in the voltage values of the flying capacitors.

In response to the above circumstances, one or more aspects of the present invention are directed to a technique for reducing voltage fluctuations resulting from parameter variations among components and improving stability in a multilevel power converter including flying capacitors.

Solution to Problem

A power converter according to one aspect of the present disclosure includes a controller and a power conversion unit. The power conversion unit causes, based on a control command from the controller, conduction or opening between a drain terminal and a source terminal of each of a plurality of switches and converts direct current power input into a first input terminal and a second input terminal to alternating current power to output the alternating current power from a first output terminal and a second output terminal.

The power conversion unit includes a direct current capacitor circuit, a first capacitor circuit, a second capacitor circuit, a first output circuit, and a second output circuit.

The direct current capacitor circuit includes a first direct current capacitor and a second direct current capacitor connected in series between the first input terminal and the second input terminal. The first direct current capacitor has an end connected to the first input terminal. The second direct current capacitor has an end connected to the second input terminal.

The first capacitor circuit includes a first switch, a second switch, a third switch, and a fourth switch connected in series. The first capacitor circuit includes a first flying capacitor having one end connected to a node between the source terminal of the first switch and the drain terminal of the second switch and another end connected to a node between the source terminal of the third switch and the drain terminal of the fourth switch.

The second capacitor circuit includes a fifth switch, a sixth switch, a seventh switch, and an eighth switch connected in series. The second capacitor circuit includes a second flying capacitor having one end connected to a node between the source terminal of the fifth switch and the drain terminal of the sixth switch and another end connected to a node between the source terminal of the seventh switch and the drain terminal of the eighth switch.

The first output circuit includes a ninth switch, a tenth switch, an eleventh switch, and a twelfth switch connected in series between the first input terminal and the second input terminal. The ninth switch includes the drain terminal connected to the first input terminal. The twelfth switch includes the source terminal connected to the second input terminal.

The second output circuit includes a thirteenth switch, a fourteenth switch, a fifteenth switch, and a sixteenth switch connected in series between the first input terminal and the second input terminal. The thirteenth switch includes the drain terminal connected to the first input terminal. The sixteenth switch includes the source terminal connected to the second input terminal.

The first output circuit includes a node between the source terminal of the ninth switch and the drain terminal of the tenth switch connected to the drain terminal of the first switch in the first capacitor circuit, a node between the source terminal of the eleventh switch and the drain terminal of the twelfth switch connected to the source terminal of the fourth switch in the first capacitor circuit, and a node between the source terminal of the tenth switch and the drain terminal of the eleventh switch connected to a node between the first direct current capacitor and the second direct current capacitor in the direct current capacitor circuit.

The second output circuit includes a node between the source terminal of the thirteenth switch and the drain terminal of the fourteenth switch connected to the drain terminal of the fifth switch in the second capacitor circuit, a node between the source terminal of the fifteenth switch and the drain terminal of the sixteenth switch connected to the source terminal of the eighth switch in the second capacitor circuit, and a node between the source terminal of the fourteenth switch and the drain terminal of the fifteenth switch connected to the node between the first direct current capacitor and the second direct current capacitor in the direct current capacitor circuit.

The controller increases or decreases a period for charging and discharging the first direct current capacitor and the second direct current capacitor based on a deviation of a detected voltage value of the first flying capacitor from a voltage command value and a deviation of a detected voltage value of the second flying capacitor from a voltage command value, and outputs alternating current power from the second output terminal connected to a node between the source terminal of the second switch and the drain terminal of the third switch in the first capacitor circuit and from the first output terminal connected to a node between the source terminal of the sixth switch and the drain terminal of the seventh switch in the second capacitor circuit.

The power converter with the structure increases or decreases the periods for charging and discharging the first direct current (DC) capacitor dc1 and the second DC capacitor dc2 based on the deviation for the voltage (VFC1) of the flying capacitor fc1 and the deviation for the voltage (VFC2) of the flying capacitor fc2. This allows the voltages of the first DC capacitor dc1 and the second DC capacitor dc2 to be controlled at a constant level, thus improving stability and generating AC power with higher accuracy.

In one aspect of the present disclosure, when the alternating current power has a positive current polarity, the controller may increase a closing period of the second switch (S1) and decrease a closing period of the first switch (S3) in the first capacitor circuit in response to the detected voltage value of the first flying capacitor being greater than a first voltage value, and decrease the closing period of the second switch (S1) and increase the closing period of the first switch (S3) in the first capacitor circuit in response to the detected voltage value of the first flying capacitor being less than the first voltage value. This allows voltage control of the flying capacitor fc1 by increasing or decreasing the on-time (duty cycle) of each of the switch S1 and the switch S3 in the first flying capacitor circuit 12 based on the voltage (VFC1) of the flying capacitor fc1 when the AC power has a positive current polarity, thus generating AC power with higher accuracy.

In one aspect of the present disclosure, when the alternating current power has a positive current polarity, the controller may decrease a closing period of the sixth switch (S9) and increase a closing period of the fifth switch (S11) in the second capacitor circuit in response to the detected voltage value of the second flying capacitor being greater than a first voltage value, and increase the closing period of the sixth switch (S9) and decrease the closing period of the fifth switch (S11) in the second capacitor circuit in response to the detected voltage value of the second flying capacitor being less than the first voltage value. This allows voltage control of the flying capacitor fc2 by increasing or decreasing the on-time (duty cycle) of each of the switch S9 and the switch S11 in the second flying capacitor circuit 13 based on the voltage (VFC2) of the flying capacitor fc2 when the AC power has a positive current polarity, thus generating AC power with higher accuracy.

In one aspect of the present disclosure, when the alternating current power has a negative current polarity, the controller may decrease a closing period of the second switch (S1) and increase a closing period of the first switch (S3) in the first capacitor circuit in response to the detected voltage value of the first flying capacitor being greater than a first voltage value, and increase the closing period of the second switch (S1) and decrease the closing period of the first switch (S3) in the first capacitor circuit in response to the detected voltage value of the first flying capacitor being less than the first voltage value. This allows voltage control of the flying capacitor fc1 by increasing or decreasing the on-time (duty cycle) of each of the switch S1 and the switch S3 in the first flying capacitor circuit 12 based on the voltage (VFC1) of the flying capacitor fc1 when the AC power has a negative current polarity, thus generating AC power with higher accuracy.

In one aspect of the present disclosure, when the alternating current power has a negative current polarity, the controller may increase a closing period of the sixth switch (S9) and decrease a closing period of the fifth switch (S11) in the second capacitor circuit in response to the detected voltage value of the second flying capacitor being greater than a first voltage value, and decrease the closing period of the sixth switch (S9) and increase the closing period of the fifth switch (S11) in the second capacitor circuit in response to the detected voltage value of the second flying capacitor being less than the first voltage value. This allows voltage control of the flying capacitor fc2 by increasing or decreasing the on-time (duty cycle) of each of the switch S9 and the switch S11 in the second flying capacitor circuit 13 based on the voltage (VFC2) of the flying capacitor fc2 when the AC power has a negative current polarity, thus generating AC power with higher accuracy.

In one aspect of the present disclosure, when the alternating current power has a positive voltage polarity and a positive current polarity, and the deviation of the detected voltage value of the second flying capacitor from the voltage command value is greater than the deviation of the detected voltage value of the first flying capacitor from the voltage command value, the controller may increase the closing period of the first switch (S3) in the first capacitor circuit in response to a detected voltage value of the first direct current capacitor being greater than a second voltage value, and decrease the closing period of the first switch (S3) in the first capacitor circuit in response to the detected voltage value of the first direct current capacitor being less than the second voltage value. This allows selection of the switch (S3) for controlling the voltage (VDC1) of the first DC capacitor dc1 based on the deviation for the voltage (VFC1) of the flying capacitor fc1 and the deviation for the voltage (VFC2) of the flying capacitor fc2 when the AC power has a positive voltage polarity and a positive current polarity. The on-time (duty cycle D3) of the switch S3 in the first flying capacitor circuit 12 is then increased or decreased based on the voltage value (VDC1) of the first DC capacitor dc1 to control the voltage value (VDC1).

In one aspect of the present disclosure, when the alternating current power has a positive voltage polarity and a positive current polarity, and the deviation of the detected voltage value of the second flying capacitor from the voltage command value is less than the deviation of the detected voltage value of the first flying capacitor from the voltage command value, the controller may increase a closing period of the fifth switch (S11) in the second capacitor circuit in response to a detected voltage value of the first direct current capacitor being greater than a second voltage value, and decrease the closing period of the fifth switch (S11) in the second capacitor circuit in response to the detected voltage value of the first direct current capacitor being less than the second voltage value. This allows selection of the switch (S11) for controlling the voltage (VDC1) of the first DC capacitor dc1 based on the deviation for the voltage (VFC1) of the flying capacitor fc1 and the deviation for the voltage (VFC2) of the flying capacitor fc2 when the AC power has a positive voltage polarity and a positive current polarity. The on-time (duty cycle D11) of the switch S11 in the second flying capacitor circuit 13 is then increased or decreased based on the voltage value (VDC1) of the first DC capacitor dc1 to control the voltage value (VDC1).

In one aspect of the present disclosure, when the alternating current power has a negative voltage polarity and a negative current polarity, and the deviation of the detected voltage value of the second flying capacitor from the voltage command value is greater than the deviation of the detected voltage value of the first flying capacitor from the voltage command value, the controller may increase the closing period of the first switch (S3) in the first capacitor circuit in response to a detected voltage value of the first direct current capacitor being greater than a second voltage value, and decrease the closing period of the first switch (S3) in the first capacitor circuit in response to the detected voltage value of the first direct current capacitor being less than the second voltage value. This allows selection of the switch (S3) for controlling the voltage (VDC1) of the first DC capacitor dc1 based on the deviation for the voltage (VFC1) of the flying capacitor fc1 and the deviation for the voltage (VFC2) of the flying capacitor fc2 when the AC power has a negative voltage polarity and a negative current polarity. The on-time (duty cycle D3) of the switch S3 in the first flying capacitor circuit 12 is then increased or decreased based on the voltage value (VDC1) of the first DC capacitor dc1 to control the voltage value (VDC1).

In one aspect of the present disclosure, when the alternating current power has a negative voltage polarity and a negative current polarity, and the deviation of the detected voltage value of the second flying capacitor from the voltage command value is less than the deviation of the detected voltage value of the first flying capacitor from the voltage command value, the controller may increase a closing period of the fifth switch (S11) in the second capacitor circuit in response to a detected voltage value of the first direct current capacitor being greater than a second voltage value, and decrease the closing period of the fifth switch (S11) in the second capacitor circuit in response to the detected voltage value of the first direct current capacitor being less than the second voltage value. This allows selection of the switch (S11) for controlling the voltage (VDC1) of the first DC capacitor dc1 based on the deviation for the voltage (VFC1) of the flying capacitor fc1 and the deviation for the voltage (VFC2) of the flying capacitor fc2 when the AC power has a negative voltage polarity and a negative current polarity. The on-time (duty cycle D11) of the switch S11 in the second flying capacitor circuit 13 is then increased or decreased based on the voltage value (VDC1) of the first DC capacitor dc1 to control the voltage value (VDC1).

In one aspect of the present disclosure, when the alternating current power has a negative voltage polarity and a positive current polarity, and the deviation of the detected voltage value of the second flying capacitor from the voltage command value is greater than the deviation of the detected voltage value of the first flying capacitor from the voltage command value, the controller may decrease the closing period of the first switch (S3) in the first capacitor circuit in response to a detected voltage value of the first direct current capacitor being greater than a second voltage value, and increase the closing period of the first switch (S3) in the first capacitor circuit in response to the detected voltage value of the first direct current capacitor being less than the second voltage value. This allows selection of the switch (S3) for controlling the voltage (VDC1) of the first DC capacitor dc1 based on the deviation for the voltage (VFC1) of the flying capacitor fc1 and the deviation for the voltage (VFC2) of the flying capacitor fc2 when the AC power has a negative voltage polarity and a positive current polarity. The on-time (duty cycle D3) of the switch S3 in the first flying capacitor circuit 12 is then increased or decreased based on the voltage value (VDC1) of the first DC capacitor dc1 to control the voltage value (VDC1).

In one aspect of the present disclosure, when the alternating current power has a negative voltage polarity and a positive current polarity, and the deviation of the detected voltage value of the second flying capacitor from the voltage command value is less than the deviation of the detected voltage value of the first flying capacitor from the voltage command value, the controller may decrease a closing period of the fifth switch (S11) in the second capacitor circuit in response to a detected voltage value of the first direct current capacitor being greater than a second voltage value, and increase the closing period of the fifth switch (S11) in the second capacitor circuit in response to the detected voltage value of the first direct current capacitor being less than the second voltage value. This allows selection of the switch (S11) for controlling the voltage (VDC1) of the first DC capacitor dc1 based on the deviation for the voltage (VFC1) of the flying capacitor fc1 and the deviation for the voltage (VFC2) of the flying capacitor fc2 when the AC power has a negative voltage polarity and a positive current polarity. The on-time (duty cycle D11) of the switch S11 in the second flying capacitor circuit 13 is then increased or decreased based on the voltage value (VDC1) of the first DC capacitor dc1 to control the voltage value (VDC1).

In one aspect of the present disclosure, when the alternating current power has a positive voltage polarity and a negative current polarity, and the deviation of the detected voltage value of the second flying capacitor from the voltage command value is greater than the deviation of the detected voltage value of the first flying capacitor from the voltage command value, the controller may decrease the closing period of the first switch (S3) in the first capacitor circuit in response to a detected voltage value of the first direct current capacitor being greater than a second voltage value, and increase the closing period of the first switch (S3) in the first capacitor circuit in response to the detected voltage value of the first direct current capacitor being less than the second voltage value. This allows selection of the switch (S3) for controlling the voltage (VDC1) of the first DC capacitor dc1 based on the deviation for the voltage (VFC1) of the flying capacitor fc1 and the deviation for the voltage (VFC2) of the flying capacitor fc2 when the AC power has a positive voltage polarity and a negative current polarity. The on-time (duty cycle D3) of the switch S3 in the first flying capacitor circuit 12 is then increased or decreased based on the voltage value (VDC1) of the first DC capacitor dc1 to control the voltage value (VDC1).

In one aspect of the present disclosure, when the alternating current power has a positive voltage polarity and a negative current polarity, and the deviation of the detected voltage value of the second flying capacitor from the voltage command value is less than the deviation of the detected voltage value of the first flying capacitor from the voltage command value, the controller may decrease a closing period of the fifth switch (S11) in the second capacitor circuit in response to a detected voltage value of the first direct current capacitor being greater than a second voltage value, and increase the closing period of the fifth switch (S11) in the second capacitor circuit in response to the detected voltage value of the first direct current capacitor being less than the second voltage value. This allows selection of the switch (S11) for controlling the voltage (VDC1) of the first DC capacitor dc1 based on the deviation for the voltage (VFC1) of the flying capacitor fc1 and the deviation for the voltage (VFC2) of the flying capacitor fc2 also when the AC power has a positive voltage polarity and a negative current polarity. The on-time (duty cycle D11) of the switch S11 in the second flying capacitor circuit 13 is then increased or decreased based on the voltage value (VDC1) of the first DC capacitor dc1 to control the voltage value (VDC1).

A control method according to another aspect of the present disclosure is a method for controlling a power converter.

The power converter includes a controller and a power conversion unit. The power conversion unit causes, based on a control command from the controller, conduction or opening between a drain terminal and a source terminal of each of a plurality of switches and converts direct current power input into a first input terminal and a second input terminal to alternating current power to output the alternating current power from a first output terminal and a second output terminal.

The power conversion unit includes a direct current capacitor circuit, a first capacitor circuit, a second capacitor circuit, a first output circuit, and a second output circuit.

The direct current capacitor circuit includes a first direct current capacitor and a second direct current capacitor connected in series between the first input terminal and the second input terminal. The first direct current capacitor has an end connected to the first input terminal. The second direct current capacitor has an end connected to the second input terminal.

The first capacitor circuit includes a first switch, a second switch, a third switch, and a fourth switch connected in series. The first capacitor circuit includes a first flying capacitor having one end connected to a node between the source terminal of the first switch and the drain terminal of the second switch and another end connected to a node between the source terminal of the third switch and the drain terminal of the fourth switch.

The second capacitor circuit includes a fifth switch, a sixth switch, a seventh switch, and an eighth switch connected in series. The second capacitor circuit includes a second flying capacitor having one end connected to a node between the source terminal of the fifth switch and the drain terminal of the sixth switch and another end connected to a node between the source terminal of the seventh switch and the drain terminal of the eighth switch.

The first output circuit includes a ninth switch, a tenth switch, an eleventh switch, and a twelfth switch connected in series between the first input terminal and the second input terminal. The ninth switch includes the drain terminal connected to the first input terminal. The twelfth switch includes the source terminal connected to the second input terminal.

The second output circuit includes a thirteenth switch, a fourteenth switch, a fifteenth switch, and a sixteenth switch connected in series between the first input terminal and the second input terminal. The thirteenth switch includes the drain terminal connected to the first input terminal. The sixteenth switch includes the source terminal connected to the second input terminal.

The first output circuit includes a node between the source terminal of the ninth switch and the drain terminal of the tenth switch connected to the drain terminal of the first switch in the first capacitor circuit, a node between the source terminal of the eleventh switch and the drain terminal of the twelfth switch connected to the source terminal of the fourth switch in the first capacitor circuit, and a node between the source terminal of the tenth switch and the drain terminal of the eleventh switch connected to a node between the first direct current capacitor and the second direct current capacitor in the direct current capacitor circuit.

The second output circuit includes a node between the source terminal of the thirteenth switch and the drain terminal of the fourteenth switch connected to the drain terminal of the fifth switch in the second capacitor circuit, a node between the source terminal of the fifteenth switch and the drain terminal of the sixteenth switch connected to the source terminal of the eighth switch in the second capacitor circuit, and a node between the source terminal of the fourteenth switch and the drain terminal of the fifteenth switch connected to the node between the first direct current capacitor and the second direct current capacitor in the direct current capacitor circuit.

The control method includes increasing or decreasing, with the controller, a period for charging and discharging the first direct current capacitor and the second direct current capacitor based on a deviation of a detected voltage value of the first flying capacitor from a voltage command value and a deviation of a detected voltage value of the second flying capacitor from a voltage command value, and outputting, with the controller, alternating current power from the second output terminal connected to a node between the source terminal of the second switch and the drain terminal of the third switch in the first capacitor circuit and from the first output terminal connected to a node between the source terminal of the sixth switch and the drain terminal of the seventh switch in the second capacitor circuit.

With the method according to this aspect, the power converter can increase or decrease the periods for charging and discharging the first DC capacitor dc1 and the second DC capacitor dc2 based on the deviation for the voltage (VFC1) of the flying capacitor fc1 and the deviation for the voltage (VFC2) of the flying capacitor fc2. This allows the voltages of the first DC capacitor dc1 and the second DC capacitor dc2 to be controlled at a constant level, thus improving stability and generating AC power with higher accuracy.

Advantageous Effects

The technique according to the above aspects of the present invention reduces voltage fluctuations resulting from parameter variations among components and improves stability in the multilevel power converter including the flying capacitors.

DETAILED DESCRIPTION

Example Use

An example use of a structure according to one or more embodiments of the present invention will now be described with reference to the drawings.

Figure 1:
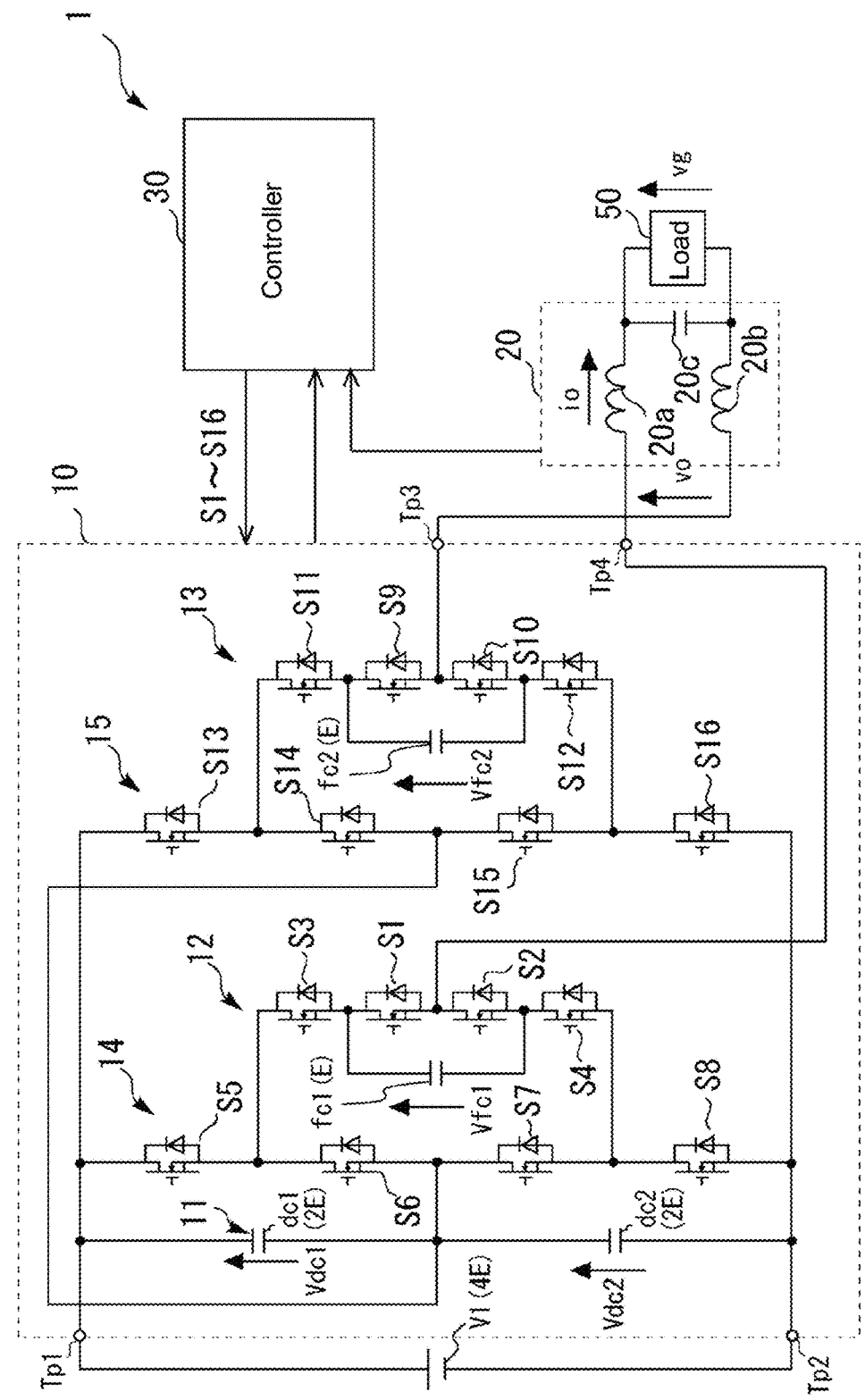
FIG. 1 is a schematic block diagram of a power converter according to a first embodiment of the present invention.

FIG. 1 is a schematic block diagram of a power converter 1 according to one example use of the present invention. FIG. 1 shows an example power converter including a power conversion unit 10 that converts direct current (DC) power supplied from a DC power supply V1 to alternating current (AC) power that follows a sinusoidal voltage command value using voltages of multiple levels (five in the present embodiment). The power conversion unit 10 includes a DC capacitor circuit 11, a first flying capacitor circuit 12, a second flying capacitor circuit 13, a first output circuit 14, and a second output circuit 15.

The power conversion unit 10 in this example includes an active neutral point clamped (ANPC) inverter circuit including the first flying capacitor circuit 12, the second flying capacitor circuit 13, the first output circuit 14, and the second output circuit 15. The power conversion unit 10 including the ANPC inverter circuit controls a first DC capacitor dc1 and a second DC capacitor dc2 to be at a voltage 2E and a flying capacitor fc1 and a flying capacitor fc2 to be at a voltage E to generate potentials of five levels (4E, 2E, 0, −2E, and −4E). The generated potentials of five levels are output to an output terminal Tp3 and an output terminal Tp4 through selective control of the open state and the closed state (on and off) of each switch included in the first flying capacitor circuit 12, the second flying capacitor circuit 13, the first output circuit 14, and the second output circuit 15.

The DC capacitor circuit 11 includes the first DC capacitor dc1 and the second DC capacitor dc2 connected in series between an input terminal Tp1 and an input terminal Tp2. The first DC capacitor dc1 has one end connected to the input terminal Tp1. The second DC capacitor dc2 has an end opposite to the node with the first DC capacitor dc1 connected to the input terminal Tp2.

The first flying capacitor circuit 12 includes four switches, a switch S3, a switch S1, a switch S2, and a switch S4, connected in series in the stated order. The first flying capacitor circuit 12 also includes the flying capacitor fc1 having one end connected to the node at which the source terminal of the switch S3 and the drain terminal of the switch S1 are connected and the other end connected to the node at which the source terminal of the switch S2 and the drain terminal of the switch S4 are connected. The node at which the source terminal of the switch S1 and the drain terminal of the switch S2 are connected is connected to the output terminal Tp4 of the power conversion unit 10.

The second flying capacitor circuit 13 includes four switches, a switch S11, a switch S9, a switch S10, and a switch S12, connected in series in the stated order. The second flying capacitor circuit 13 also includes the flying capacitor fc2 having one end connected to the node at which the source terminal of the switch S11 and the drain terminal of the switch S9 are connected and the other end connected to the node at which the source terminal of the switch S10 and the drain terminal of the switch S12 are connected. The node at which the source terminal of the switch S9 and the drain terminal of the switch S10 are connected is connected to the output terminal Tp3 of the power conversion unit 10.

The first output circuit 14 includes four switches, a switch S5, a switch S6, a switch S7, and a switch S8, connected in series in the stated order. The drain terminal of the switch S5 is connected to the input terminal Tp1, and the source terminal of the switch S8 is connected to the input terminal Tp2. The second output circuit 15 includes four switches, a switch S13, a switch S14, a switch S15, and a switch S16, connected in series in the stated order. The drain terminal of the switch S13 is connected to the input terminal Tp1, and the source terminal of the switch S16 is connected to the input terminal Tp2.

The node at which the source terminal of the switch S6 and the drain terminal of the switch S7 in the first output circuit 14 are connected is connected to the node between the first DC capacitor dc1 and the second DC capacitor dc2 in the DC capacitor circuit 11. The node at which the source terminal of the switch S14 and the drain terminal of the switch S15 in the second output circuit 15 are connected is connected to the node between the first DC capacitor dc1 and the second DC capacitor dc2 in the DC capacitor circuit 11.

The drain terminal of the switch S3 in the first flying capacitor circuit 12 is connected to the node at which the source terminal of the switch S5 and the drain terminal of the switch S6 in the first output circuit 14 are connected. The source terminal of the switch S4 in the first flying capacitor circuit 12 is connected to the node at which the source terminal of the switch S7 and the drain terminal of the switch S8 in the first output circuit 14 are connected. The drain terminal of the switch S11 in the second flying capacitor circuit 13 is connected to the node at which the source terminal of the switch S13 and the drain terminal of the switch S14 in the second output circuit 15 are connected. The source terminal of the switch S10 in the second flying capacitor circuit 13 is connected to the node at which the source terminal of the switch S15 and the drain terminal of the switch S16 in the second output circuit 15 are connected.

Figure 2:
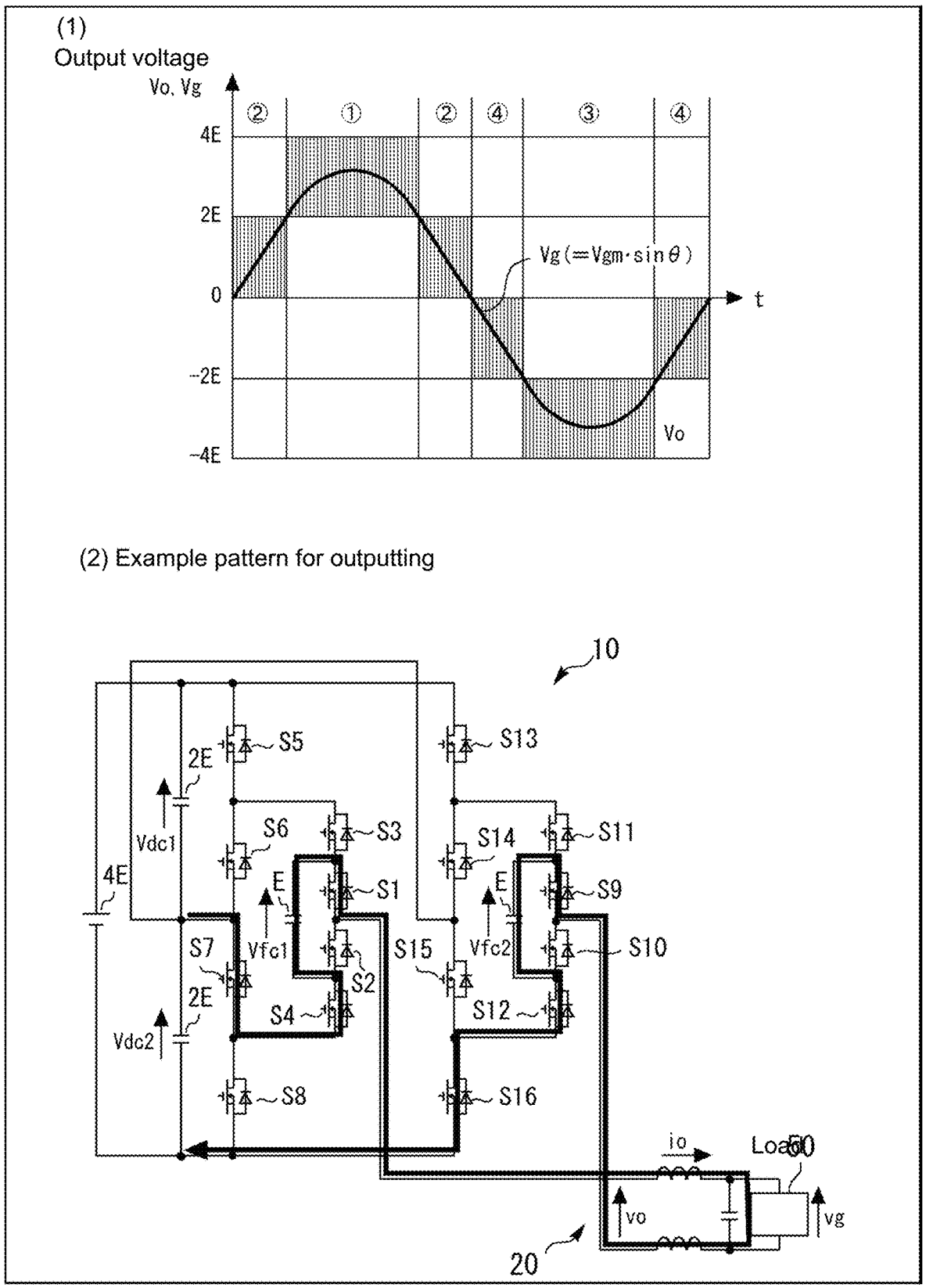
FIG. 2 is a diagram describing AC power generated with potentials of five levels in the first embodiment of the present invention.
Figure 3:
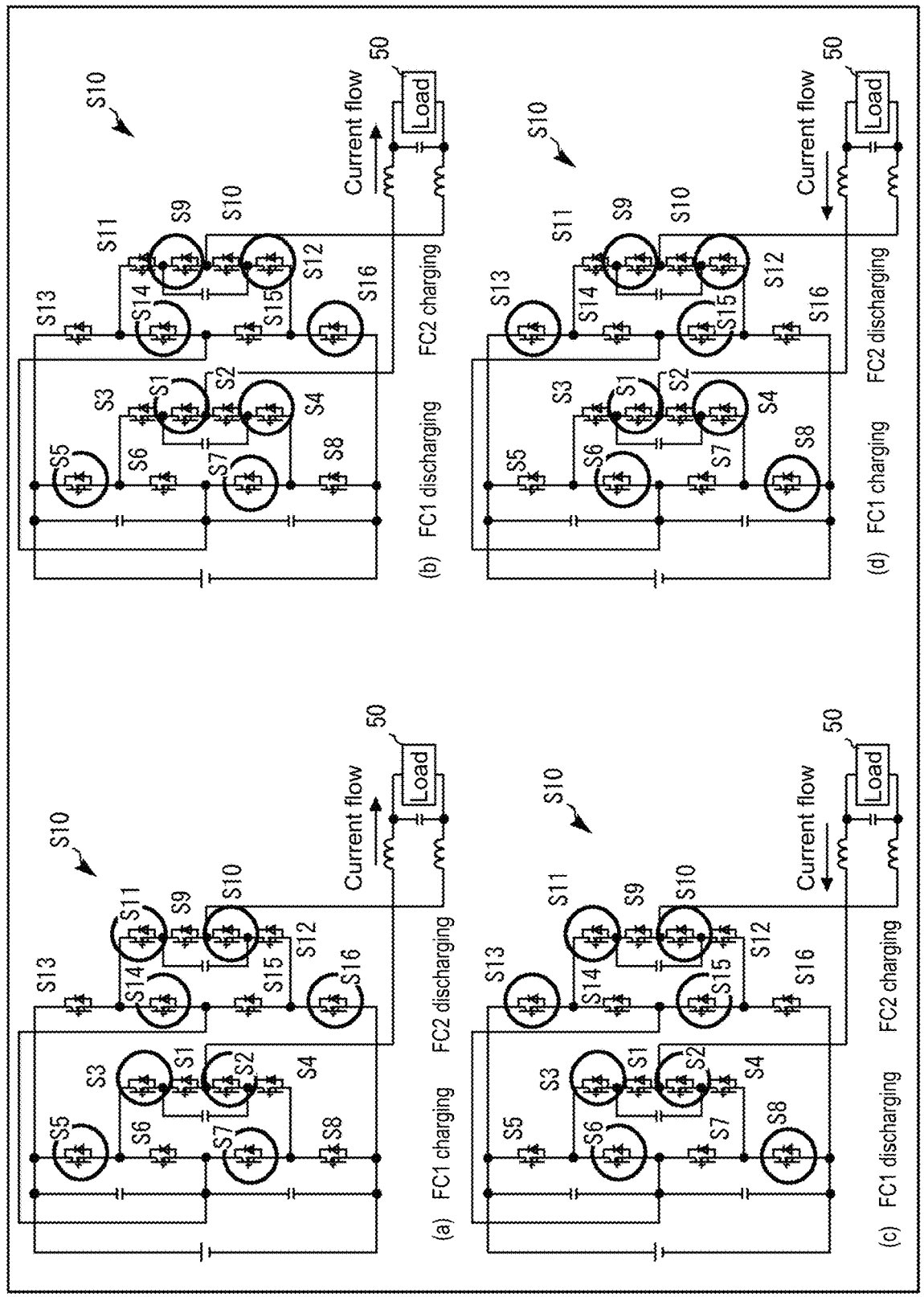
FIG. 3 is a diagram describing charge and discharge modes in flying capacitors in the first embodiment of the present invention.
Figure 4:
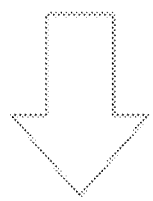
FIG. 4 is a table showing the charge and discharge states of capacitors in a power conversion unit in the first embodiment of the present invention.

As shown in FIGS. 2 to 4, when the time taken for each of the switching patterns in FIG. 3 (*a*) to (*d*) are the same, the flying capacitor fc1, the flying capacitor fc2, the first DC capacitor dc1, and the second DC capacitor dc2 each have a constant voltage. For example, each of the flying capacitor fc1 and the flying capacitor fc2 has the voltage E, and each of the first DC capacitor dc1 and the second DC capacitor dc2 has the voltage 2E. However, the components of each of the first flying capacitor circuit 12, the second flying capacitor circuit 13, the first output circuit 14, and the second output circuit 15 have parameter variations. For example, the switches included in each circuit have variations in stray capacitance and resistance, causing a difference in switching time. Any difference in switching time can cause fluctuation of the voltage output from the power conversion unit 10.

As shown in FIGS. 6 to 14, the power converter 1 in this example controls each switch for charging and discharging the flying capacitor fc1, the flying capacitor fc2, the first DC capacitor dc1, and the second DC capacitor dc2 to reduce voltage fluctuations resulting from parameter variations among components. More specifically, the power converter 1 includes a controller 30 that controls the voltage of the flying capacitor fc1 by increasing or decreasing the on-time (duty cycle) of each of the switch S1 and the switch S3 in the first flying capacitor circuit 12. Similarly, the controller 30 controls the voltage of the flying capacitor fc2 by increasing or decreasing the duty cycle of each of the switch S9 and the switch S11 in the second flying capacitor circuit 13. The controller 30 in the power converter 1 in this example controls the voltages of the first DC capacitor dc1 and the second DC capacitor dc2 by increasing or decreasing the duty cycle of the switch S3 or the switch S11 based on the voltages of the flying capacitor fc1 and the flying capacitor fc2. The power converter 1 in this example controls the switches in the above manner to control the flying capacitor fc1, the flying capacitor fc2, the first DC capacitor dc1, and the second DC capacitor dc2 to be at constant voltages, thus improving stability and generating AC power with higher accuracy.

First Embodiment

Embodiments of the present invention will now be described in more detail with reference to the drawings.
<Configuration of Power Converter>

FIG. 1 is a schematic block diagram of the power converter 1 according to an embodiment of the present invention. The power converter 1 serves as a power conditioner in a distributed power supply system including, for example, a photovoltaic power generator, a rechargeable battery, or a fuel cell. The power converter 1 is interconnected to the power grid. The distributed power supply in the distributed power supply system, including a photovoltaic power generator, a storage batter, or a fuel cell is connected to a DC-DC converter that can control output of the corresponding distributed power supply to serve as a DC power supply V1. The power converter 1 converts the DC power supplied from the DC power supply V1 to AC power and outputs the resulting AC power to a load 50 and to the interconnected power grid. In the embodiment described below, AC power is output to the load 50. The power converter 1 is connected to, with the input terminal Tp1 and the input terminal Tp2, a DC bus that connects the power converter and the DC-DC converter. In FIG. 1, the input terminal Tp1 is connected to the positive bus of the DC bus, and the input terminal Tp2 is connected to the negative bus of the DC bus.

The power converter 1 includes the power conversion unit 10, a filter 20, and the controller 30. The power conversion unit 10 converts the DC power supplied from the DC power supply V1 to AC power that follows a sinusoidal voltage command value using voltages of multiple levels (five in the present embodiment). The AC power from the power conversion unit 10 is output to the filter 20 through the output terminal Tp3 and the output terminal Tp4. The power conversion unit 10 includes the DC capacitor circuit 11, the first flying capacitor circuit 12, the second flying capacitor circuit 13, the first output circuit 14, and the second output circuit 15. In the present embodiment, the DC capacitor circuit 11 corresponds to an example of a direct current capacitor circuit, the first flying capacitor circuit 12 to an example of a first capacitor circuit, and the second flying capacitor circuit 13 to an example of a second capacitor circuit.

The DC capacitor circuit 11 includes the first DC capacitor dc1 and the second DC capacitor dc2 connected in series between the input terminal Tp1 and the input terminal Tp2. The first DC capacitor dc1 has one end connected to the input terminal Tp1. The second DC capacitor dc2 has an end opposite to the node with the first DC capacitor dc1 connected to the input terminal Tp2. The first DC capacitor dc1 and the second DC capacitor dc2 equally divide the voltage (4E) of the DC power input between the input terminal Tp1 and the input terminal Tp2, with the respective capacitor voltages being 2E as shown in FIG. 1. The first DC capacitor dc1 and the second DC capacitor dc2 also serve as snubbers to reduce surge voltages generated in the power conversion unit 10. In the present embodiment, the first DC capacitor dc1 corresponds to an example of a first direct current capacitor, and the second DC capacitor dc2 to an example of a second direct current capacitor.

The first flying capacitor circuit 12 includes the switch S1, the switch S2, the switch S3, the switch S4, and the capacitor fc1 (hereafter also referred to as the flying capacitor fc1). In the present embodiment, the switch S1 corresponds to an example of a second switch, the switch S2 to an example of a third switch, the switch S3 to an example of a first switch, and the switch S4 to an example of a fourth switch. The capacitor fc1 in the present embodiment corresponds to an example of a first flying capacitor.

The switches S1 to S4 included in the first flying capacitor circuit 12 are, for example, N-channel metal-oxide-semiconductor field-effect transistors (MOSFETs), each with a diode connected between the drain terminal and the source terminal. The diode has the anode connected to the source terminal of the N-channel MOSFET and the cathode connected to the drain terminal. The switches S1 to S4 included in the first flying capacitor circuit 12 are connected in series in the order of the switch S3, the switch S1, the switch S2, and the switch S4 as shown in FIG. 1. The flying capacitor fc1 has one end connected to the node at which the source terminal of the switch S3 and the drain terminal of the switch S1 are connected and the other end connected to the node at which the source terminal of the switch S2 and the drain terminal of the switch S4 are connected. The node at which the source terminal of the switch S1 and the drain terminal of the switch S2 are connected is connected to the output terminal Tp4 of the power conversion unit 10. The output terminal Tp4 in the present embodiment corresponds to an example of a second output terminal.

The second flying capacitor circuit 13 includes the switch S9, the switch S10, the switch S11, the switch S12, and the capacitor fc2 (hereafter also referred to as the flying capacitor fc2). In the present embodiment, the switch S9 corresponds to an example of a sixth switch, the switch S10 to an example of a seventh switch, the switch S11 to an example of a fifth switch, and the switch S12 to an example of an eighth switch. The capacitor fc2 in the present embodiment corresponds to an example of a second flying capacitor.

The switches S9 to S12 included in the second flying capacitor circuit 13 are the same as the switches included in the first flying capacitor circuit 12. In other words, the switches S9 to S12 are N-channel MOSFETs each with a diode connected between the drain terminal and the source terminal. The switches S9 to S12 included in the second flying capacitor circuit 13 are connected in series in the order of the switch S11, the switch S9, the switch S10, and the switch S12 as shown in FIG. 1. The flying capacitor fc2 has one end connected to the node at which the source terminal of the switch S11 and the drain terminal of the switch S9 are connected and the other end connected to the node at which the source terminal of the switch S10 and the drain terminal of the switch S12 are connected. The node at which the source terminal of the switch S9 and the drain terminal of the switch S10 are connected is connected to the output terminal Tp3 of the power conversion unit 10. In the present embodiment, the output terminal Tp3 corresponds to an example of a first output terminal.

The first output circuit 14 includes the switch S5, the switch S6, the switch S7, and the switch S8. The switches S5 to S8 are the same as the switches included in the first flying capacitor circuit 12, each with a diode having the anode connected to the source terminal of the N-channel MOSFET and the cathode connected to the drain terminal. As shown in FIG. 1, the switches S5 to S8 are connected in series in the order of the switch S5, the switch S6, the switch S7, and the switch S8. The switch S5 has the drain terminal connected to the input terminal Tp1. The switch S8 has the source terminal connected to the input terminal Tp2. In the present embodiment, the switch S5 corresponds to an example of a ninth switch, the switch S6 to an example of a tenth switch, the switch S7 to an example of an eleventh switch, and the switch S8 to an example of a twelfth switch.

The second output circuit 15 includes the switch S13, the switch S14, the switch S15, and the switch S16. The switches S13 to S16 are the same as the switches included in the first flying capacitor circuit 12, each with a diode having the anode connected to the source terminal of the N-channel MOSFET and the cathode connected to the drain terminal. As shown in FIG. 1, the switches S13 to S16 are connected in series in the order of the switch S13, the switch S14, the switch S15, and the switch S16. The switch S13 has the drain terminal connected to the input terminal Tp1, and the switch S16 has the source terminal connected to the input terminal Tp2. In the present embodiment, the switch S13 corresponds to an example of a thirteenth switch, the switch S14 to an example of a fourteenth switch, the switch S15 to an example of a fifteenth switch, and the switch S16 to an example of a sixteenth switch.

The node at which the source terminal of the switch S6 and the drain terminal of the switch S7 in the first output circuit 14 are connected is connected to the node between the first DC capacitor dc1 and the second DC capacitor dc2 in the DC capacitor circuit 11. Similarly, the node at which the source terminal of the switch S14 and the drain terminal of the switch S15 in the second output circuit 15 are connected is connected to the node between the first DC capacitor dc1 and the second DC capacitor dc2 in the DC capacitor circuit 11.

The drain terminal of the switch S3 in the first flying capacitor circuit 12 is connected to the node at which the source terminal of the switch S5 and the drain terminal of the switch S6 in the first output circuit 14 are connected. The source terminal of the switch S4 in the first flying capacitor circuit 12 is connected to the node at which the source terminal of the switch S7 and the drain terminal of the switch S8 in the first output circuit 14 are connected.

Similarly, the drain terminal of the switch S11 in the second flying capacitor circuit 13 is connected to the node at which the source terminal of the switch S13 and the drain terminal of the switch S14 in the second output circuit 15 are connected. The source terminal of the switch S12 in the second flying capacitor circuit 13 is connected to the node at which the source terminal of the switch S15 and the drain terminal of the switch S16 in the second output circuit 15 are connected.

As described above, the power conversion unit 10 in the present embodiment includes an ANPC inverter circuit including the first flying capacitor circuit 12, the second flying capacitor circuit 13, the first output circuit 14, and the second output circuit 15. The power conversion unit 10 in the present embodiment including the ANPC inverter circuit controls the first DC capacitor dc1 and the second DC capacitor dc2 to be at the voltage 2E and the flying capacitor fc1 and the flying capacitor fc2 to be at the voltage E to generate potentials of five levels (4E, 2E, 0, −2E, and −4E). The generated potentials of five levels are output to the output terminal Tp3 and the output terminal Tp4 through selective control of the open state and the closed state of each switch included in the first flying capacitor circuit 12, the second flying capacitor circuit 13, the first output circuit 14, and the second output circuit 15. In the present embodiment, each switch in an open state refers to the switch being open between the drain terminal and the source terminal and in an off-state. Each switch in a closed state refers to the switch being in a conducting state between the drain terminal and the source terminal and in an on-state.

The power conversion unit 10 in the present embodiment also outputs AC power with the generated potentials of five levels to the load 50 and the interconnected power grid through the node at which the source terminal of the switch S1 and the drain terminal of the switch S2 in the first flying capacitor circuit 12 are connected and the node at which the source terminal of the switch S9 and the drain terminal of the switch S10 in the second flying capacitor circuit 13 are connected. This reduces a common mode in which a current flows in through the reference potential (GND) from devices such as the load 50 connected to the output end of the power converter 1 according to the present embodiment or devices including the DC power supply V1 connected with the DC bus. More specifically, the voltage values of the flying capacitor fc1, the flying capacitor fc2, the first DC capacitor dc1, and the second DC capacitor dc2 farther from intended values can cause more noise in the common mode, whereas such voltage values closer to the intended values can cause less noise in the common mode.

The filter 20 includes an inductor 20a, an inductor 20b, and a capacitor 20c. The inductor 20a has one end connected to the output terminal Tp4 and the other end connected to one end of the capacitor 20c. The inductor 20b has one end connected to the output terminal Tp3 and the other end connected to the other end of the capacitor 20c. The filter 20 reduces the harmonic components of the AC power output from the first flying capacitor circuit 12 and the second flying capacitor circuit 13 and outputs the AC power to the load 50 connected to the power converter 1 and the interconnected power grid. In the filter 20, the output current value io of the AC power generated by the power conversion unit 10 for output to the load 50 is measured with a current sensor. The output voltage value vo (voltage applied to the capacitor 20c) of the AC power is measured with a voltage sensor.

The controller 30 includes, for example, a processor (e.g., a central processing unit or a CPU), a memory, a gate driver, and a communication interface circuit. The controller 30 receives outputs from various sensors (voltage and current sensors) in the power conversion unit 10 and from the current sensor and the voltage sensor in, for example, the filter 20. The controller 30 outputs a control signal to control the opening and closing (on and off) of each switch included in the power conversion unit 10. The controller controls the opening and closing of the switches S1 to S16 based on information detected with the various sensors described above, thus controlling the voltage values of the first DC capacitor dc1 and the second DC capacitor dc2 to be 2E and the voltage values of the flying capacitor fc1 and the flying capacitor fc2 to be E. Similarly, the voltage values clamped in the first DC capacitor dc1, the second DC capacitor dc2, the flying capacitor fc1, and the flying capacitor fc2 are charged and discharged by selectively opening and closing the switches S1 to S16. This generates potentials of five levels (4E, 2E, 0, −2E, and −4E). The generated potentials of five levels are modulated with, for example, carrier comparison-based pulse width modulation (PWM) and then undergo addition and subtraction operations following a sinusoidal voltage command value based on a control pattern for selecting the opening and closing of each switch. The resulting potential is then output to the output terminal Tp3 and the output terminal Tp4.

FIG. 2 is a diagram describing AC power generated with the potentials of five levels. In FIG. 2 (1) is a graph showing an example waveform of the AC power generated with the potentials of five levels. In FIG. 2 (2) shows an example switching pattern for outputting the generated potential 2E. In FIG. 2 (1), the vertical axis indicates the output voltage of the power conversion unit 10, and the horizontal axis indicates time. The output voltage Vo represents the AC voltage input into the filter 20. The output voltage Vg represents the AC voltage input into the load 50. The graph Vg (=Vgm·sin θ) in FIG. 2 (1) represents the trend of the sinusoidal command value, where m is the modulation rate. In FIG. 2, Vgm=4E·m.

As shown in FIG. 2 (1), in the sections labeled with the circled 2, PWM is performed between potentials 0 and 2E to cause the voltage value to follow the sinusoidal voltage command value. Similarly, PWM is performed in the section labeled with the circled 1 between potentials 2E and 4E to cause the voltage value to follow the sinusoidal voltage command value, performed in the sections labeled with the circled 4 between potentials 0 and −2E, and performed in the section labeled with the circled 3 between potentials −2E and −4E. The controller 30 outputs the voltage to the output terminal Tp3 and the output terminal Tp4 based on the switching pattern for outputting the AC power generated in each section to cause the voltage value to follow the sinusoidal voltage command value. The switching pattern herein refers to a combination of conducting or open switches for outputting the voltage value modulated in each section following the sinusoidal voltage command value. The controller 30 selects the switches to be open or closed for each section to control the conduction or opening of the switches, thus controlling the charging and discharging of the flying capacitor fc1 and the flying capacitor fc2. The energy in the flying capacitor fc1 and the flying capacitor fc2 charges through the energy charged in the first DC capacitor dc1 and the second DC capacitor dc2.

In FIG. 2 (2), the thick solid arrow represents the path of current flow when the potential 2E is output. When the potential 2E is output as in FIG. 2 (2), each switch on the path represented by the thick solid arrow is in the conducting state. In other words, the switch S7 included in the first output circuit 14 is in the conducting state between the drain terminal and the source terminal. Each of the switch S4 and the switch S1 included in the first flying capacitor circuit 12 is in the conducting state between the drain terminal and the source terminal. The switch S16 included in the second output circuit 15 is in the conducting state between the drain terminal and the source terminal. Each of the switch S12 and the switch S9 included in the second flying capacitor circuit 13 is in the conducting state between the drain terminal and the source terminal. The controller 30 changes the operating voltage of the gate terminal of each of the above switches to the on-state to cause conduction between the drain terminal and the source terminal of each of the switch S7, the switch S4, the switch S1, the switch S16, the switch S12, and the switch S9. This discharges the energy charged in the flying capacitor fc1 in the first flying capacitor circuit 12 and charges the energy into the flying capacitor fc2 in the second flying capacitor circuit 13. The potential 2E across the terminals of the second DC capacitor dc2 is output to the filter 20 through the output terminal Tp4 connected to the source terminal of the switch S1 in the first flying capacitor circuit 12 and the output terminal Tp3 connected to the source terminal of the switch S9 in the second flying capacitor circuit 13. More specifically, the output voltage value vo detected in the filter 20 can be expressed as {VDC2+VFC1−VFC2}, where the voltage value of the second DC capacitor dc2 is VDC2, the energy charged in the flying capacitor fc1 is VFC1, and the energy charged in the flying capacitor fc2 is VFC2.

FIG. 3 is a diagram describing charge and discharge modes in the flying capacitor fc1 and the flying capacitor fc2. In FIG. 3, the thick solid arrows also represent the paths of current flow. The first flying capacitor circuit 12 has two different current paths for charging and discharging the flying capacitor fc1. The second flying capacitor circuit 13 also has two different current paths for charging and discharging the flying capacitor fc2. The power conversion unit 10 including the first flying capacitor circuit 12 and the second flying capacitor circuit 13 thus has four different switching patterns shown in FIG. 3 (*a*) to (*d*). In the power conversion unit 10 in the present embodiment, the on-off states of the switches S1 to S16 included in the first flying capacitor circuit 12, the second flying capacitor circuit 13, the first output circuit 14, and the second output circuit 15 are controlled to output the voltage following the sinusoidal voltage command value. In FIG. 3 (*a*) to (*d*), the switches in circles are in the conducting state between the drain terminal and the source terminal and are in the on-state. In FIG. 3 (*a*) and (*b*), the current flows from the power conversion unit 10 to the load 50. In FIG. 3 (*c*) and (*d*), the current flows from the load 50 to the power conversion unit 10.

In the switching pattern shown in FIG. 3 (*a*), the switch S3 and the switch S2 in the first flying capacitor circuit 12 are each in the conducting state between the drain terminal and the source terminal and are in the on-state. The switch S5 and the switch S7 in the first output circuit 14 are each in the conducting state between the drain terminal and the source terminal and are in the on-state. The switch S11 and the switch S10 in the second flying capacitor circuit 13 are each in the conducting state between the drain terminal and the source terminal and are in the on-state. The switch S14 and the switch S16 in the second output circuit 15 are each in the conducting state between the drain terminal and the source terminal and are in the on-state. This forms a current path to the load 50 through the drain terminal of the switch S5 connected to the high potential terminal of the first DC capacitor dc1 and the source terminal of the switch S14 connected to the low potential terminal of the first DC capacitor dc1. In other words, the current path forms from the high potential terminal to the low potential terminal of the first DC capacitor dc1 as a path including, in the stated order, the switch S5, the switch S3, the flying capacitor fc1, the switch S2, the load 50, the switch S10, the flying capacitor fc2, the switch S11, and the switch S14. This switching pattern charges the flying capacitor fc1 and discharges the flying capacitor fc2.

In the switching pattern shown in FIG. 3 (b), the switch S1 and the switch S4 in the first flying capacitor circuit 12 are each in the conducting state between the drain terminal and the source terminal and are in the on-state. The switch S5 and the switch S7 in the first output circuit 14 are each in the conducting state between the drain terminal and the source terminal and are in the on-state. The switch S9 and the switch S12 in the second flying capacitor circuit 13 are each in the conducting state between the drain terminal and the source terminal and are in the on-state. The switch S14 and the switch S16 in the second output circuit 15 are each in the conducting state between the drain terminal and the source terminal and are in the on-state. This forms a current path to the load 50 through the drain terminal of the switch S7 connected to the high potential terminal of the second DC capacitor dc2 and the source terminal of the switch S16 connected to the low potential terminal of the second DC capacitor dc2. In other words, the current path forms from the high potential terminal to the low potential terminal of the second DC capacitor dc2 as a path including, in the stated order, the switch S7, the switch S4, the flying capacitor fc1, the switch S1, the load 50, the switch S9, the flying capacitor fc2, the switch S12, and the switch S16. This switching pattern discharges the flying capacitor fc1 and charges the flying capacitor fc2.

In the switching pattern shown in FIG. 3 (c), the switch S3 and the switch S2 in the first flying capacitor circuit 12 are each in the conducting state between the drain terminal and the source terminal and are in the on-state. The switch S6 and the switch S8 in the first output circuit 14 are each in the conducting state between the drain terminal and the source terminal and are in the on-state. The switch S11 and the switch S10 in the second flying capacitor circuit 13 are each in the conducting state between the drain terminal and the source terminal and are in the on-state. The switch S13 and the switch S15 in the second output circuit 15 are each in the conducting state between the drain terminal and the source terminal and are in the on-state. This forms a current path from the load 50 to the power conversion unit 10 through the drain terminal of the switch S13 connected to the high potential terminal of the first DC capacitor dc1 and the source terminal of the switch S6 connected to the low potential terminal of the first DC capacitor dc1. In other words, the current path forms from the high potential terminal to the low potential terminal of the first DC capacitor dc1 as a path including, in the stated order, the switch S13, the switch S11, the flying capacitor fc2, the switch S10, the load 50, the switch S2, the flying capacitor fc1, the switch S3, and the switch S6. This switching pattern charges the flying capacitor fc2 and discharges the flying capacitor fc1.

In the switching pattern shown in FIG. 3 (d), the switch S1 and the switch S4 in the first flying capacitor circuit 12 are each in the conducting state between the drain terminal and the source terminal and are in the on-state. The switch S6 and the switch S8 in the first output circuit 14 are each in the conducting state between the drain terminal and the source terminal and are in the on-state. The switch S9 and the switch S12 in the second flying capacitor circuit 13 are each in the conducting state between the drain terminal and the source terminal and are in the on-state. The switch S13 and the switch S15 in the second output circuit 15 are each in the conducting state between the drain terminal and the source terminal and are in the on-state. This forms a current path from the load 50 to the power conversion unit 10 through the drain terminal of the switch S15 connected to the high potential terminal of the second DC capacitor dc2 and the source terminal of the switch S8 connected to the low potential terminal of the second DC capacitor dc2. In other words, the current path forms from the high potential terminal to the low potential terminal of the second DC capacitor dc2 as a path including, in the stated order, the switch S15, the switch S12, the flying capacitor fc2, the switch S9, the load 50, the switch S1, the flying capacitor fc1, the switch S4, and the switch S8. This switching pattern discharges the flying capacitor fc2 and charges the flying capacitor fc1.

FIG. 4 is a table showing the switching patterns in FIG. 3 (a) to (d) and the charge and discharge states of the capacitors included in the power conversion unit 10. An example table Tb1 in FIG. 4 shows the switching patterns described with reference to FIG. 3 (a) to (d) and the charge and discharge states of the flying capacitor fc1, the flying capacitor fc2, the first DC capacitor dc1, and the second DC capacitor dc2. As shown in the table Tb1 in FIG. 4, in the switching pattern in FIG. 3 (a) the flying capacitor fc1 charges, the flying capacitor fc2 discharges, the first DC capacitor dc1 discharges, and the second DC capacitor dc2 charges. In the switching pattern in FIG. 3 (b), the flying capacitor fc1 discharges, the flying capacitor fc2 charges, the first DC capacitor dc1 charges, and the second DC capacitor dc2 discharges. Similarly, in the switching pattern in FIG. 3 (c), the flying capacitor fc1 discharges, the flying capacitor fc2 charges, the first DC capacitor dc1 discharges, and second DC capacitor dc2 charges. In the switching pattern in FIG. 3 (d), the flying capacitor fc1 charges, the flying capacitor fc2 discharges, the first DC capacitor dc1 charges, and the second DC capacitor dc2 discharges.

As shown in FIG. 4, when the time taken for each of the switching patterns in FIG. 3 (a) to (d) are the same, the flying capacitor fc1, the flying capacitor fc2, the first DC capacitor dc1, and the second DC capacitor dc2 each have a constant voltage. For example, each of the flying capacitor fc1 and the flying capacitor fc2 has the voltage E, and each of the first DC capacitor dc1 and the second DC capacitor dc2 has the voltage 2E. However, the components of each of the first flying capacitor circuit 12, the second flying capacitor circuit 13, the first output circuit 14, and the second output circuit 15 have parameter variations. For example, the switches included in each circuit have variations in stray capacitance and resistance, causing a difference in switching time. The voltage values of the flying capacitor fc1 (VFC1), the flying capacitor fc2 (VFC2), the first DC capacitor dc1 (VDC1), and the second DC capacitor dc2 (VDC2) farther from intended values can cause more noise in the common mode, whereas such voltage values closer to the intended values can cause less noise in the common mode.

Figure 5:
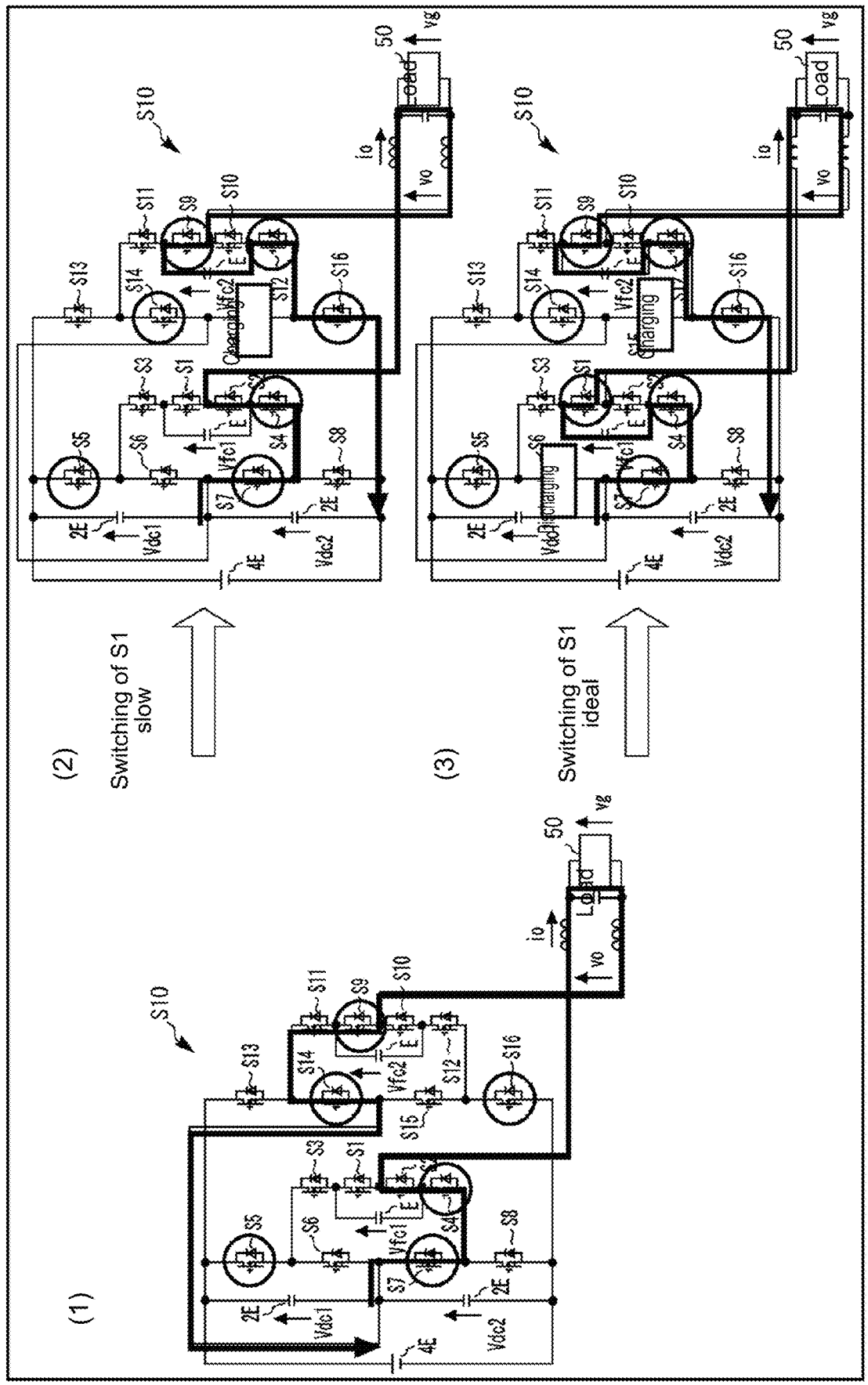
FIG. 5 is a diagram describing the effects of a switching time difference in the first embodiment of the present invention.

FIG. 5 is a diagram describing the effects of a switching time difference. FIG. 5 (1) shows the switching state immediately before the output of the potential 2E described with reference to FIG. 2 (2). FIG. 5 (2) shows the state in which the switching time of the switch S1 in the first flying capacitor circuit 12 is relatively slow. FIG. 5 (3) shows a comparative example in which the switching time of the switch S1 is ideal. In FIG. 5 (1) to (3) the switches in circles are in the conducting state between the drain terminal and the source terminal and are in the on-state. The thick solid arrows indicate the paths of current flow.

To output the potential 2E in the latest switching state shown in FIG. 5 (1), the switching state is to shift to the ideal state shown in FIG. 5 (3). More specifically, a current path forms from the switch S7 controlled to be on (being in the conducting state between the drain terminal and the source terminal) and having the drain terminal connected to the high potential terminal of the second DC capacitor dc2 to the load through the switch S4 and the switch S1. A current path also forms from the load to the low potential terminal of the second DC capacitor dc2 through the switch S9, the switch S12, and the switch S16, which are controlled to be on. The flying capacitor fc1 on the current path discharges, and the flying capacitor fc2 charges. The load receives, across the terminals, application of a voltage of {vo=VDC2+VFC1−VFC2}, or more specifically, a voltage resulting from addition of the discharge energy from the flying capacitor fc1 and the charge energy in the flying capacitor fc2 to the potential 2E clamped by the second DC capacitor dc2.

As shown in FIG. 5 (2), however, the switch S1 with a slow response due to, for example, parameters variations among components does not shift to the on-state, without forming the current path from the switch S4 to the switch S1 through the flying capacitor fc1. In the power conversion unit 10, a current flows to the load along the current path formed in the latest most recent switching state. A current path forms from the load to the low potential terminal of the second DC capacitor dc2 through the switch S9, the switch S12, and the switch S16, which are controlled to be on. This allows the flying capacitor fc2 to charge, but does not allow the flying capacitor fc1 to discharge, causing a voltage rise until the switch S1 transitions to the on-state. The power conversion unit 10 can thus output a fluctuating voltage.

The power converter 1 according to the present embodiment controls each switch for charging and discharging of the flying capacitor fc1, the flying capacitor fc2, the first DC capacitor dc1, and the second DC capacitor dc2 to reduce voltage fluctuations resulting from parameter variations among components. More specifically, the power converter 1 includes the controller 30 that controls the voltage of the flying capacitor fc1 by increasing or decreasing the on-time (duty cycle) of each of the switch S1 and the switch S3 in the first flying capacitor circuit 12. Similarly, the controller 30 controls the voltage of the flying capacitor fc2 by increasing or decreasing the duty cycle of each of the switch S9 and the switch S11 in the second flying capacitor circuit 13. The controller 30 in the power converter 1 according to the present embodiment controls the voltage of each of the first DC capacitor dc1 and the second DC capacitor dc2 by increasing or decreasing the duty cycle of the switch S3 or the switch S11 based on the voltages of the flying capacitor fc1 and the flying capacitor fc2. The power converter 1 according to the present embodiment controls the switches to achieve constant voltages of the flying capacitor fc1, the flying capacitor fc2, the first DC capacitor dc1, and the second DC capacitor dc2, thus improving stability and generating AC power with higher accuracy. The voltage control of the flying capacitor fc1, the flying capacitor fc2, the first DC capacitor dc1, and the second DC capacitor dc2 will now be described with reference to FIGS. 6 to 9.

Figure 6:
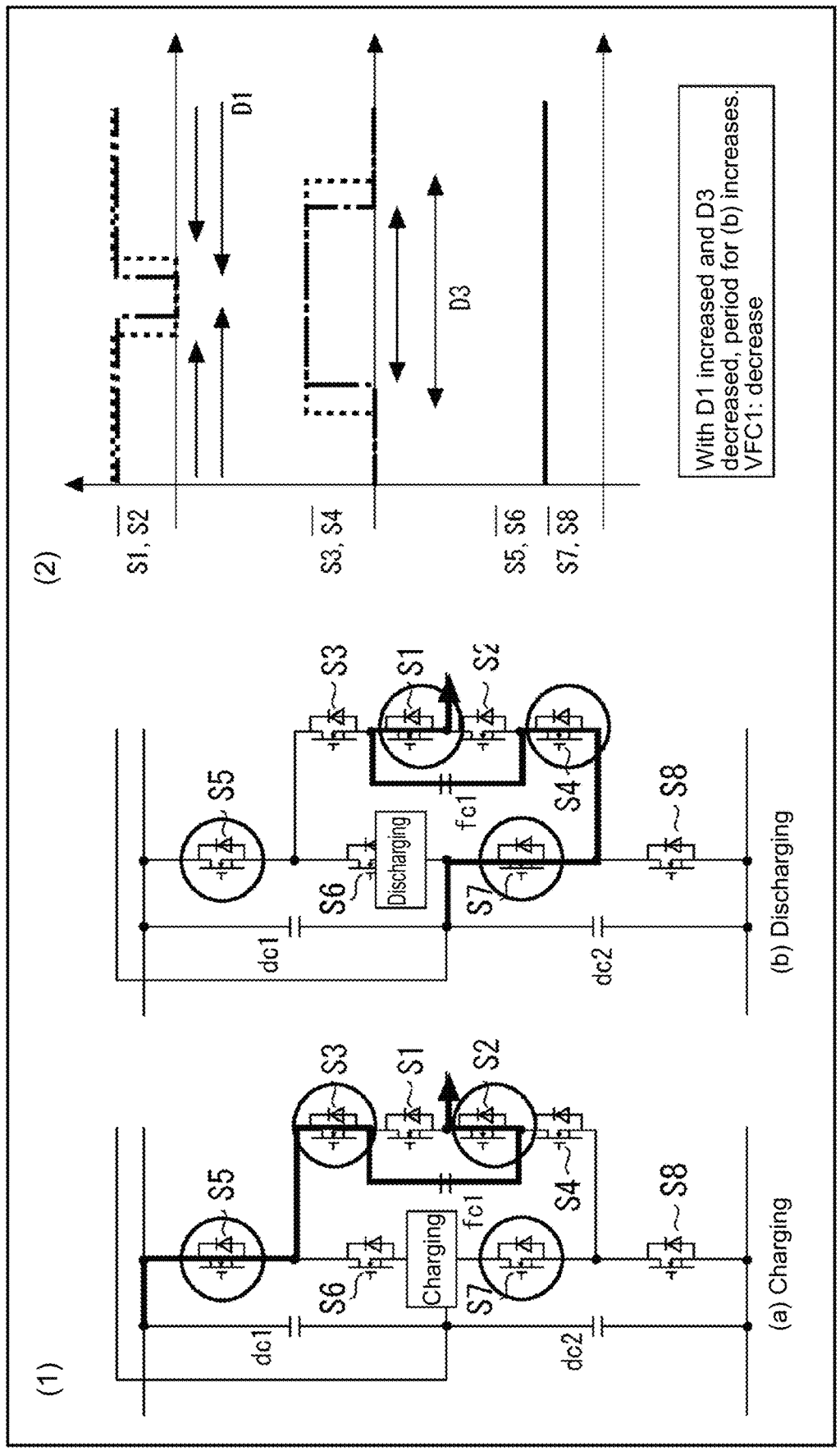
FIG. 6 is a diagram describing voltage control for a flying capacitor fc1 in the first embodiment of the present invention.

FIG. 6 is a diagram describing voltage control of the flying capacitor fc1. FIG. 6 (1) shows example current paths through the flying capacitor fc1 with thick solid arrows. The switches in circles are each in the conducting state between the drain terminal and the source terminal and are in the on-state. The flying capacitor fc1 charges with the current path shown in the diagram labeled with (a) in FIG. 6 (1) and discharges with the current path shown in the diagram labeled with (b) in FIG. 6 (1). The power converter 1 according to the present embodiment performs voltage control by selecting the on-off state of each of the switches S1 to S4 and selecting the current path through the flying capacitor fc1.

As shown in the diagram (a) in FIG. 6 (1), the drain terminal of the switch S3 in the first flying capacitor circuit 12 is connected to the high potential terminal of the first DC capacitor dc1 through the drain terminal and the source terminal of the switch S5 in the on-state. When the switch S3 and the switch S2 are in the on-state, conduction occurs through the drain terminal and the source terminal of the switch S3, the flying capacitor fc1, and the drain terminal and the source terminal of the switch S2 in the stated order to form a current path to the load. The flying capacitor fc1 charges with the current flowing from the high potential terminal of the first DC capacitor dc1 to the load through the drain terminal and the source terminal of the switch S5 in the on-state.

In the diagram (b) in FIG. 6 (1), the source terminal of the switch S4 in the first flying capacitor circuit 12 is connected to the low potential terminal of the first DC capacitor dc1 through the drain terminal and the source terminal of the switch S7 in the on-state. When the switch S4 and the switch S1 are in the on-state, conduction occurs through the drain terminal and the source terminal of the switch S4, the flying capacitor fc1, and the drain terminal and the source terminal of the switch S1 in the stated order to form a current path to the load. The flying capacitor fc1 discharges with the current flowing from the low potential terminal of the first DC capacitor dc1 to the load through the drain terminal and the source terminal of the switch S7 in the on-state.

As shown in the diagrams (a) and (b) in FIG. 6 (1), the length of the on-time (duty cycle) of each of the switch S3, the switch S2, the switch S4, and the switch S1 is controlled to control the period for charging and discharging the flying capacitor fc1, thus controlling the voltage of the flying capacitor fc1.

FIG. 6 (2) is a timing chart of the switches relative to each other for voltage control of the flying capacitor fc1. The vertical axis in FIG. 6 (2) indicates the binary (on and off) status of each switch, and the horizontal axis indicates time. The on-state and the off-state of the switch S1 and the switch S2 in the first flying capacitor circuit 12 are complementarily controlled as a pair. In other words, when one of the switches is on, the other switch is controlled to be off. The same applies to the switch S3 and the switch S4 in the first flying capacitor circuit 12, the switch S5 and the switch S6 in the first output circuit 14, and the switch S7 and the switch S8 in the first output circuit 14.

The top timeline in FIG. 6 (2) shows the transition of the on-off state of the switch S1 (S2 with overline), the middle timeline shows the transition of the on-off state of the switch S3 (S4 with overline), and the bottom timeline shows the transition of the on-off state of each of the switch S5 (S6 with overline) and the switch S7 (S8 with overline). The on-time of the switch S1 (S2 with overline) is hereafter also referred to as a duty cycle D1, and the on-time of the switch S3 (S4 with overline) as a duty cycle D3.

As in FIG. 6 (2) showing the status transitions indicated by the thin broken lines and the dot-dash lines in the upper and middle timelines, the charge period shown in the diagram (a) in FIG. 6 (1) relatively decreases and the discharge period shown in the diagram (b) in FIG. 6 (1) relatively increases in response to an increase (from the thin broken line to the dot-dash line) in the duty cycle D1 of the switch S1 (S2 with overline) and a decrease (from the thin broken line to the dot-dash line) in the duty cycle D3 of the switch S3 (S4 with overline). The voltage (VFC1) of the flying capacitor fc1 thus decreases.

Similarly, the charge period shown in the diagram (a) in FIG. 6 (1) relatively increases and the discharge period shown in the diagram (b) in FIG. 6 (1) relatively decreases in response to a decrease (from the dot-dash line to the thin broken line) in the duty cycle D1 of the switch S1 (S2 with overline) and an increase (from the dot-dash line to the thin broken line) in the duty cycle D3 of the switch S3 (S4 with overline). The voltage (VFC1) of the flying capacitor fc1 thus increases. The on-off state of each of the switch S5 (S6 with overline) and the switch S7 (S8 with overline) in the first output circuit 14 remains constant.

The power conversion unit 10 in the present embodiment controls the voltage (VFC1) of the flying capacitor fc1 by relatively increasing and decreasing the duty cycle D1, the on-time of the switch S1 (S2 with overline), and the duty cycle D3, the on-time of the switch S3 (S4 with overline).

Figure 7:
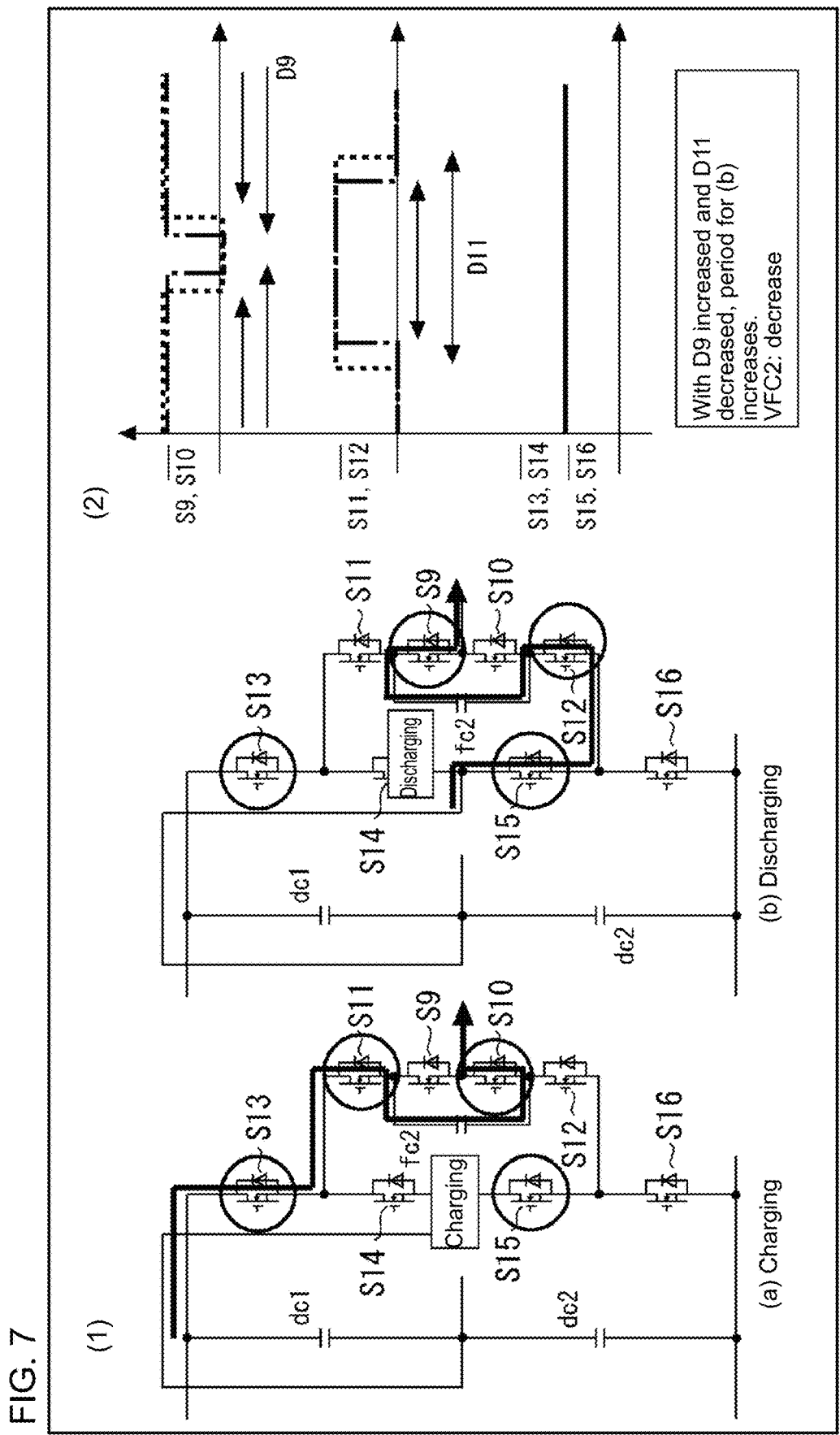
FIG. 7 is a diagram describing voltage control for a flying capacitor fc2 in the first embodiment of the present invention.

FIG. 7 is a diagram describing voltage control of the flying capacitor fc2. In the same manner as in FIG. 6 (1), FIG. 7 (1) shows example current paths through the flying capacitor fc2 with thick solid arrows. The switches in circles are each in the conducting state between the drain terminal and the source terminal and are in the on-state. The flying capacitor fc2 charges with the current path shown in the diagram (a) in FIG. 7 (1) and discharges with the current path shown in the diagram (b) in FIG. 7 (1). The power converter 1 performs voltage control by selecting the on-off states of the switches S9 to S12 and selecting the current path through the flying capacitor fc2.

In the second flying capacitor circuit 13, as shown in the diagram (a) in FIG. 7 (1), the drain terminal of the switch S11 is connected to the high potential terminal of the first DC capacitor dc1 through the drain terminal and the source terminal of the switch S13 in the on-state. When the switch S11 and the switch S10 are in the on-state, conduction occurs through the drain terminal and the source terminal of the switch S11, the flying capacitor fc2, and the drain terminal and the source terminal of the switch S10 in the stated order to form a current path to the load. The flying capacitor fc2 charges with the current flowing from the high potential terminal of the first DC capacitor dc1 to the load through the drain terminal and the source terminal of the switch S13 in the on-state.

In the second flying capacitor circuit 13, as shown in the diagram (b) in FIG. 7 (1), the source terminal of the switch S12 is connected to the low potential terminal of the first DC capacitor dc1 through the drain terminal and the source terminal of the switch S15 in the on-state. When the switch S12 and the switch S9 are in the on-state, conduction occurs through the drain terminal and the source terminal of the switch S12, the flying capacitor fc2, the drain terminal and the source terminal of the switch S9 in the stated order to form a current path to the load. The flying capacitor fc2 discharges with the current flowing from the low potential terminal of the first DC capacitor dc1 to the load through the drain terminal and the source terminal of the switch S15 in the on-state. Thus, as shown in the diagrams (a) and (b) in FIG. 7 (1), the length of the on-time (duty cycle) of each of the switch S11, the switch S10, the switch S12, and the switch S9 is controlled to control the period for charging and discharging the flying capacitor fc2, thus controlling the voltage of the flying capacitor fc2.

FIG. 7 (2) is a timing chart of the switches relative to each other for voltage control of the flying capacitor fc2. The vertical axis in FIG. 7 (2) indicates the binary (on and off) status of each switch, and the horizontal axis indicates time. In the second flying capacitor circuit 13 as well, the on-state and the off-state of the switch S9 and the switch S10 are complementarily controlled as a pair. When the switch S9 is on, the switch S10 is controlled to be off. The same applies to the switch S11 and the switch S12 in the second flying capacitor circuit 13, the switch S13 and the switch S14 in the second output circuit 15, and the switch S15 and the switch S16 in the second output circuit 15.

The top timeline in FIG. 7 (1) shows the transition of the on-off state of the switch S9 (S10 with overline), the middle timeline shows the transition of the on-off state of the switch S11 (S12 with overline), and the bottom timeline shows the transition of the on-off state of each of the switch S13 (S14 with overline) and the switch S15 (S16 with overline). The on-time of the switch S9 (S10 with overline) is hereafter also referred to as a duty cycle D9, and the on-time of the switch S11 (S12 with overline) as a duty cycle D11.

As in FIG. 7 (2) showing the status transitions indicated by the thin broken lines and the dot-dash lines in the upper and middle timelines, the charge period shown in the diagram (a) in FIG. 7 (1) relatively decreases and the discharge period shown in the diagram (b) in FIG. 7(1) relatively increases in response to an increase (from the thin broken line to the dot-dash line) in the duty cycle D9 of the switch S9 (S10 with overline) and a decrease (from the thin broken line to the dot-dash line) in the duty cycle D11 of the switch S11 (S12 with overline). The voltage (VFC2) of the flying capacitor fc2 thus decreases.

Similarly, the charge period shown in the diagram (a) in FIG. 7 (1) relatively increases and the discharge period shown in the diagram (b) in FIG. 7 (1) relatively decreases in response to a decrease (from the dot-dash line to the thin broken line) in the duty cycle D9 of the switch S9 (S10 with overline) and an increase (from the dot-dash line to the thin broken line) in the duty cycle D11 of the switch S11 (S12 with overline). The voltage (VFC1) of the flying capacitor fc1 thus increases. The on-off state of each of the switch S13 (S14 with overline) and the switch S15 (S16 with overline) in the second output circuit 15 remains constant.

The power conversion unit 10 in the present embodiment controls the voltage (VFC2) of the flying capacitor fc2 by relatively increasing and decreasing the duty cycle D9, the on-time of the switch S9 (S10 with overline), and the duty cycle D11, the on-time of the switch S11 (S12 with overline).

Figure 8:
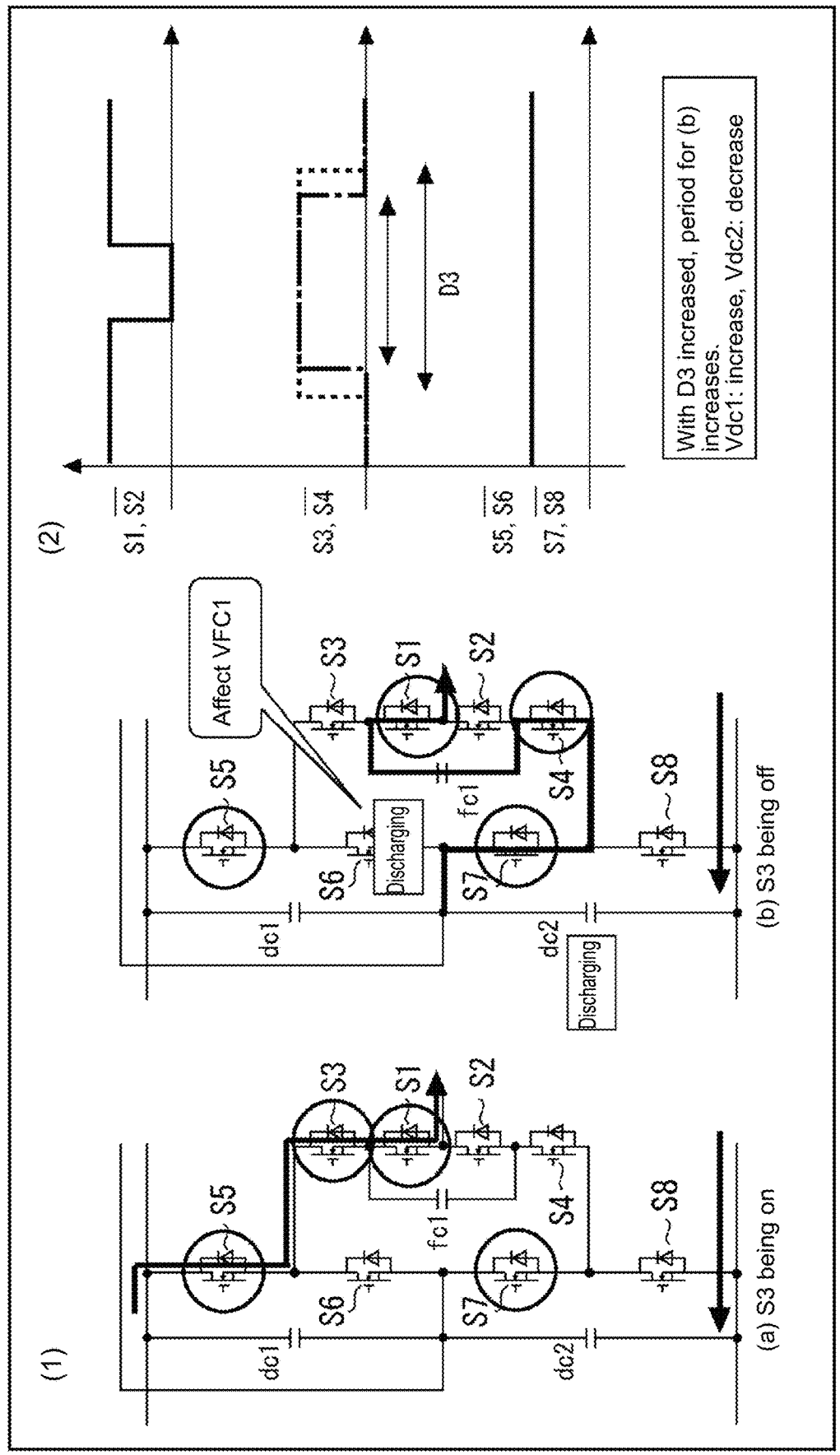
FIG. 8 is a diagram describing voltage control for a first DC capacitor dc1 and a second DC capacitor dc2 in the first embodiment of the present invention.
Figure 9:
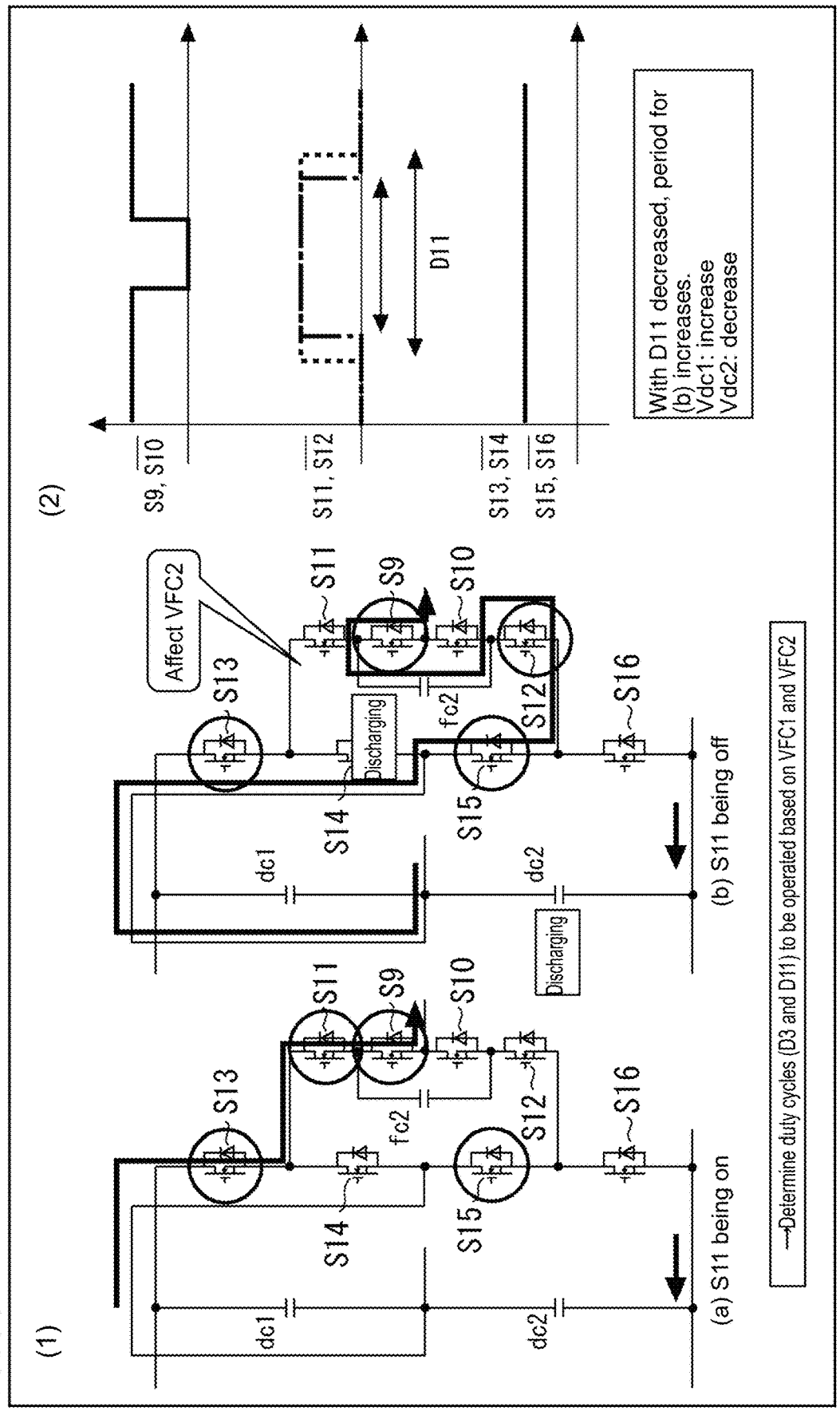
FIG. 9 is a diagram describing voltage control for the first DC capacitor dc1 and the second DC capacitor dc2 in the first embodiment of the present invention.

FIG. 8 is a diagram describing voltage control of the first DC capacitor dc1 and the second DC capacitor dc2. FIG. 9 is a diagram describing voltage control of the first DC capacitor dc1 and the second DC capacitor dc2. FIG. 8 (1) shows example current paths through the flying capacitor fc1 with thick solid arrows. The switches in circles are each in the conducting state between the drain terminal and the source terminal and are in the on-state. The diagram (a) in FIG. 8 (1) shows an example current path to the load through the switch S3 in the on-state in the first flying capacitor circuit 12. More specifically, a current path to the load forms through the respective drain terminals and source terminals of the switch S5, the switch S3, and the switch S1 each being in the on-state and connected to the high potential terminal of the first DC capacitor dc1. The current path forms from the source terminal of the switch S1 to the load and through the load to the low potential terminal of the second DC capacitor dc2.

The diagram (b) in FIG. 8 (1) shows an example current path to the load when the switch S3 in the first flying capacitor circuit 12 is in the off-state. More specifically, conduction occurs through the drain terminal and the source terminal of the switch S7 in the on-state connected to the high potential terminal of the second DC capacitor dc2, the drain terminal and the source terminal of the switch S4, the flying capacitor fc1, and the drain terminal and the source terminal of the switch S1 in the stated order to form a current path to the load. The current path forms from the source terminal of the switch S1 to the load and through the load to the low potential terminal of the second DC capacitor dc2. The second DC capacitor dc2 and the flying capacitor fc1 on the current path thus discharge. As described with reference to FIG. 6, the discharge of the flying capacitor fc1 in the off-state of the switch S3 in the first flying capacitor circuit 12 affects the voltage control of the flying capacitor fc1.

FIG. 8 (2) is a timing chart of the switches relative to each other for voltage control of the flying capacitor fc1. The vertical axis in FIG. 8 (2) indicates the binary (on and off) status of each switch, and the horizontal axis indicates time. In the same manner as in FIG. 6, the on-state and the off-state of the switch S1 and the switch S2 in the flying capacitor circuit 12 are complementarily controlled as a pair. The on-state and the off-state of the switch S3 and the switch S4 are complementarily controlled as a pair. The same applies to the switch S5 and the switch S6 in the first output circuit 14 and the switch S7 and the switch S8 in the first output circuit 14.

The top timeline in FIG. 8 (2) shows the transition of the on-off state of the switch S1 (S2 with overline), the middle timeline shows the transition of the on-off state of the switch S3 (S4 with overline), and the bottom timeline shows the transition of the on-off state of each of the switch S5 (S6 with overline) and the switch S7 (S8 with overline). In FIG. 8 (2), the duty cycle D3 represents the on-time of the switch S3 (S4 with overline).

As in FIG. 8 (2) showing the status transition indicated by the thin broken line and the dot-dash line in the middle timeline, the discharge period shown in the diagram (b) in FIG. 8 (1) relatively increases in response to a decrease (from the thin broken line to the dot-dashed line) in the duty cycle D3 of the switch S3 (S4 with overline). More specifically, the longer discharge period for the second DC capacitor dc2 decreases the voltage (Vdc2) of the second DC capacitor dc2 and increases the voltage (Vdc1) of the first DC capacitor dc1.

Similarly, the discharge period shown in the diagram (b) in FIG. 8 (1) relatively decreases in response to an increase (from the dot-dashed line to the thin broken line) in the duty cycle D3 of the switch S3 (S4 with overline). More specifically, the shorter discharge period for the second DC capacitor dc2 increases the voltage (Vdc2) of the second DC capacitor dc2 and decreases the voltage (Vdc1) of the first DC capacitor dc1. In other words, the duty cycle D3, the on-time of the switch S3 (S4 with overline), is relatively increased or decreased to control the voltage (Vdc2) of the second DC capacitor dc2 and the voltage (Vdc1) of the first DC capacitor dc1.

An example voltage control will be described with reference to FIG. 9. FIG. 9 (1) shows example current paths through the flying capacitor fc2 with thick solid arrows. The switches in circles are each in the conducting state between the drain terminal and the source terminal and are in the on-state. The diagram (a) in FIG. 9 (1) shows an example current path to the load through the switch S11 in the on-state in the second flying capacitor circuit 13. More specifically, a current path to the load forms through the respective drain terminals and source terminals of the switch S13, the switch S11, and the switch S9 each being in the on-state and connected to the high potential terminal of the first DC capacitor dc1. The current path forms from the source terminal of the switch S9 to the load and through the load to the low potential terminal of the second DC capacitor dc2.

The diagram (b) in FIG. 9 (1) shows an example current path to the load when the switch S11 in the second flying capacitor circuit 13 is in the off-state. More specifically, conduction occurs through the drain terminal and the source terminal of the switch S15 in the on-state connected to the high potential terminal of the second DC capacitor dc2, the drain terminal and the source terminal of the switch S12, the flying capacitor fc2, and the drain terminal and the source terminal of the switch S9 in the stated order to form a current path to the load. The current path forms from the source terminal of the switch S9 to the load and through the load to the low potential terminal of the second DC capacitor dc2. The second DC capacitor dc2 and the flying capacitor fc2 on the current path thus discharge. As described with reference to FIG. 7, the discharge of the flying capacitor fc2 in the off-state of the switch S11 in the second flying capacitor circuit 13 affects the voltage control of the flying capacitor fc2.

FIG. 9 (2) is a timing chart of the switches relative to each other for voltage control of the flying capacitor fc2. The vertical axis in FIG. 9 (2) indicates the binary (on and off) status of each switch, and the horizontal axis indicates time. In the same manner as in FIG. 7 (2), the on-state and the off-state of the switch S9 and the switch S10 in the flying capacitor circuit 13 are complementarily controlled as a pair. The on-state and the off-state of the switch S11 and the switch S12 in the flying capacitor circuit 13 are complementarily controlled as a pair. The same applies to the switch S13 and the switch S14 in the second output circuit 15 and the switch S15 and the switch S16 in the second output circuit 15.

The top timeline in FIG. 9 (2) shows the transition of the on-off state of the switch S9 (S10 with overline), the middle timeline shows the transition of the on-off state of the switch S11 (S12 with overline), and the bottom timeline shows the transition of the on-off state of each of the switch S13 (S14 with overline) and the switch S15 (S16 with overline). In FIG. 9 (2), the duty cycle D11 represents the on-time of the switch S11 (S12 with overline).

As in FIG. 9 (2) showing the status transition indicated by the thin broken line and the dot-dash line in the middle timeline, the discharge period shown in the diagram (b) in FIG. 9 (1) increases in response to a decrease (from the thin broken line to the dot-dashed line) in the duty cycle D11 of the switch S11 (S12 with overline). More specifically, the longer discharge period for the second DC capacitor dc2 decreases the voltage (Vdc2) of the second DC capacitor dc2 and increases the voltage (Vdc1) of the first DC capacitor dc1.

The discharge period shown in the diagram (b) in FIG. 9 (1) decreases in response to an increase (from the dot-dashed line to the thin broken line) in the duty cycle D11 of the switch S11 (S12 with overline). More specifically, the shorter discharge period for the second DC capacitor dc2 increases the voltage (Vdc2) of the second DC capacitor dc2 and decreases the voltage (Vdc1) of the first DC capacitor dc1. In FIG. 9 as well, the length of the duty cycle D11, which is the on-time of the switch S11 (S12 with overline), is relatively increased or decreased to control the voltage (Vdc2) of the second DC capacitor dc2 and the voltage (Vdc1) of the first DC capacitor dc1.

As described with reference to FIG. 8 and FIG. 9, the voltage (Vdc1) of the first DC capacitor dc1 and the voltage (Vdc2) of the second DC capacitor dc2 can be controlled relatively by controlling either the duty cycle D3 of the switch S3 or the duty cycle D11 of the switch S11. As described with reference to FIG. 6 and FIG. 7, the duty cycle D3 of the switch S3 affects the voltage control of the flying capacitor fc1, and the duty cycle D11 of the switch S11 affects the voltage control of the flying capacitor fc2. The power converter 1 according to the present embodiment thus determines the switches to be controlled for the voltage (Vdc1) of the first DC capacitor dc1 and the voltage (Vdc2) of the second DC capacitor dc2 based on the controlled voltage (VFC1) of the flying capacitor fc1 and the controlled voltage (VFC2) of the flying capacitor fc2. In the present embodiment, the duty cycle of each of the determined switches is increased or decreased to control the increase or decrease of the voltage (Vdc1) of the first DC capacitor dc1 and the voltage (Vdc2) of the second DC capacitor dc2.

<Configuration of Controller>

Figure 10:
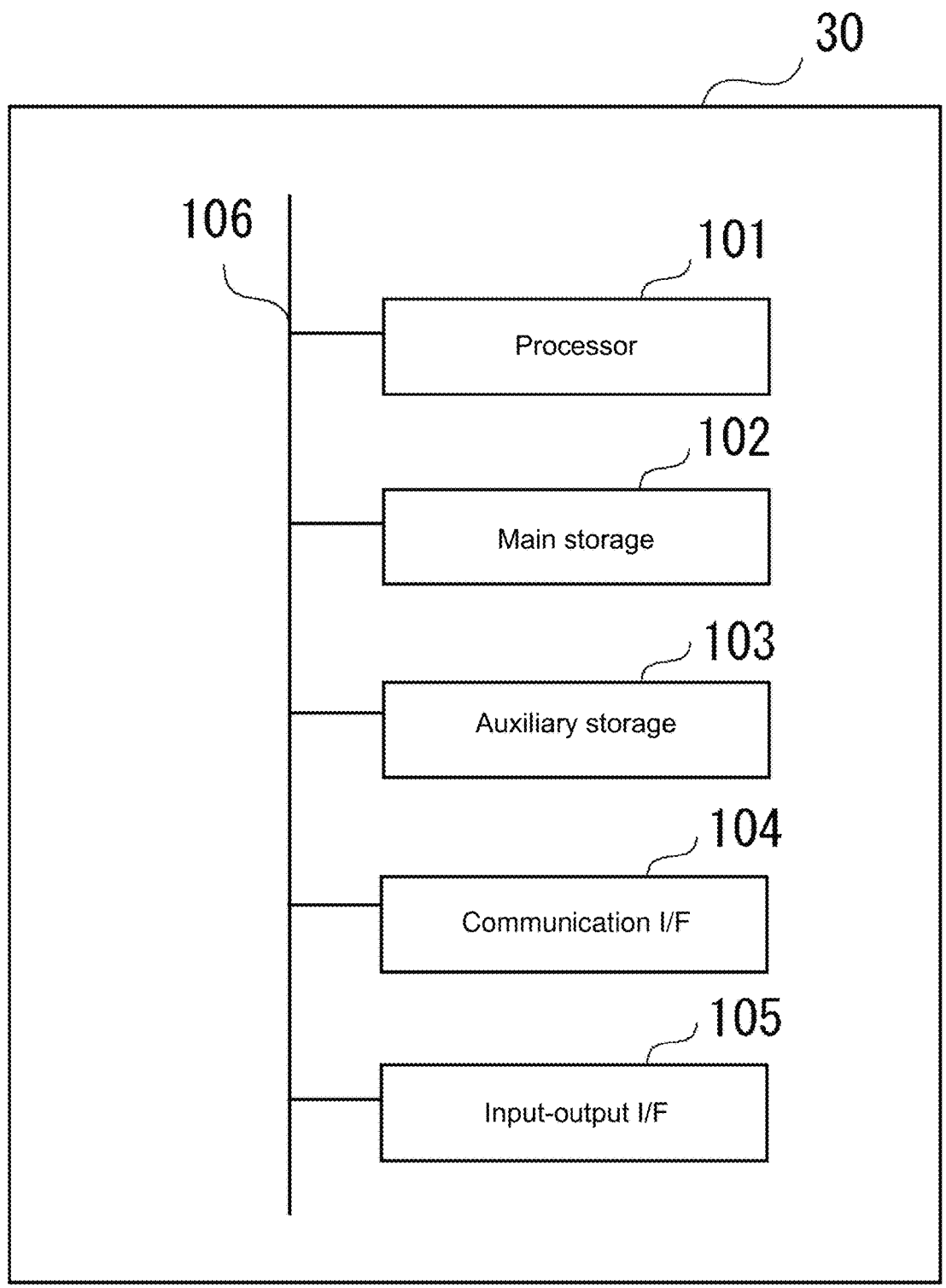
FIG. 10 is a diagram of a controller in the first embodiment of the present invention showing the hardware configuration.

FIG. 10 is a diagram of the controller 30 in the power converter 1 according to the present embodiment, showing the hardware configuration. As shown in FIG. 10, the controller 30 is a computer including, as its components, a processor 101, a main storage 102, an auxiliary storage 103, a communication interface (I/F) 104, and an input-output interface (I/F) 105 interconnected with a connection bus 106. The main storage 102 and the auxiliary storage 103 are recording media readable by the controller 30. The controller 30 may include multiple processors 101, main storages 102, auxiliary storages 103, communication interfaces 104, and input-output interfaces 105, or eliminate at least one of the components.

The processor 101 is a central processing arithmetic unit that centrally controls the controller 30. The processor 101 is, for example, a central processing unit (CPU), a micro processing unit (MPU), or a digital signal processor (DSP). The processor 101 loads, for example, a program stored in the auxiliary storage 103 into the work area of the main storage 102 in an executable manner and controls peripheral devices by executing the program to provide intended functions. Some or all of the functions of the processor 101 may be provided by, for example, an application-specific integrated circuit (ASIC) or a graphics processing unit (GPU). Similarly, some or all of the functions may be implemented by dedicated large scale integration (LSI) such as a field-programmable gate array (FPGA), a numerical processor, or other hardware circuits.

The main storage 102 and the auxiliary storage 103 serve as the memory of the controller 30. The main storage 102 stores, for example, programs executable by the processor 101 and data to be processed by the processor. The main storage 102 includes a flash memory, a random-access memory (RAM), or a read-only memory (ROM). The auxiliary storage 103 is a storage medium that stores programs executable by the processor 101 and other devices, as well as configuration information for operation. The auxiliary storage 103 includes, for example, a hard disk drive (HDD), a solid state drive (SSD), an erasable programmable read-only memory (EPROM), a flash memory, a universal serial bus (USB) memory, and a secure digital (SD) memory card. The communication I/F 104 is a communication interface. The communication I/F 104 may have another configuration as appropriate for the connection method with the device to be connected. In the present embodiment, the controller 30 provides various control commands to the power conversion unit 10 connected with the communication I/F 104. In the present embodiment, the controller 30 obtains signals output from various sensors in each component of the power converter 1 connected with the communication I/F 104. The input-output I/F 105 allows input and output of data with the input device and the output device included in the power converter 1. Data is output to a display device such as a liquid crystal display (LCD) through the input-output I/F 105. The input-output I/F 105 receives operation instructions for the processing intended by the operator.

<Process>

FIGS. 11 to 14 are flowcharts showing an example voltage control process performed by the power converter 1 according to the present embodiment. The process in FIG. 11 to FIG. 14 stabilizes the voltages of the flying capacitor fc1 and the flying capacitor fc2 and the voltages of the first DC capacitor dc1 and the second DC capacitor dc2 that are interrelated to one another. As shown in FIGS. 11 to 14, the voltage control process in the present embodiment is performed based on the relationship between the polarity of the output voltage (vo indicating voltage applied to the capacitor 20c) and the polarity of the output current (io) of the AC power output to the load 50. The relative phase regions (regions on the time axis) of the output voltage (vo) and the output current (io) of the AC power output to the load 50 are divided into first to fourth regions by combining polarities in the phases of the output voltage and the output current. The first region is, for example, a phase region in which the output voltage polarity is positive and the output current polarity is positive. Similarly, the second region is, for example, a phase region in which the output voltage polarity is negative and the output current polarity is negative. The third region is a phase region in which the output voltage polarity is positive and the output current polarity is negative. The fourth region is a phase region in which the output voltage polarity is negative and the output current polarity is positive. The power converter 1 according to the present embodiment performs the voltage control process more stably and generates AC power with higher accuracy as appropriate for the relative phase regions of the output voltage (vo) and output current (io) of the AC power output to the load 50 divided into first to fourth regions.

(First Region)

Figure 11:
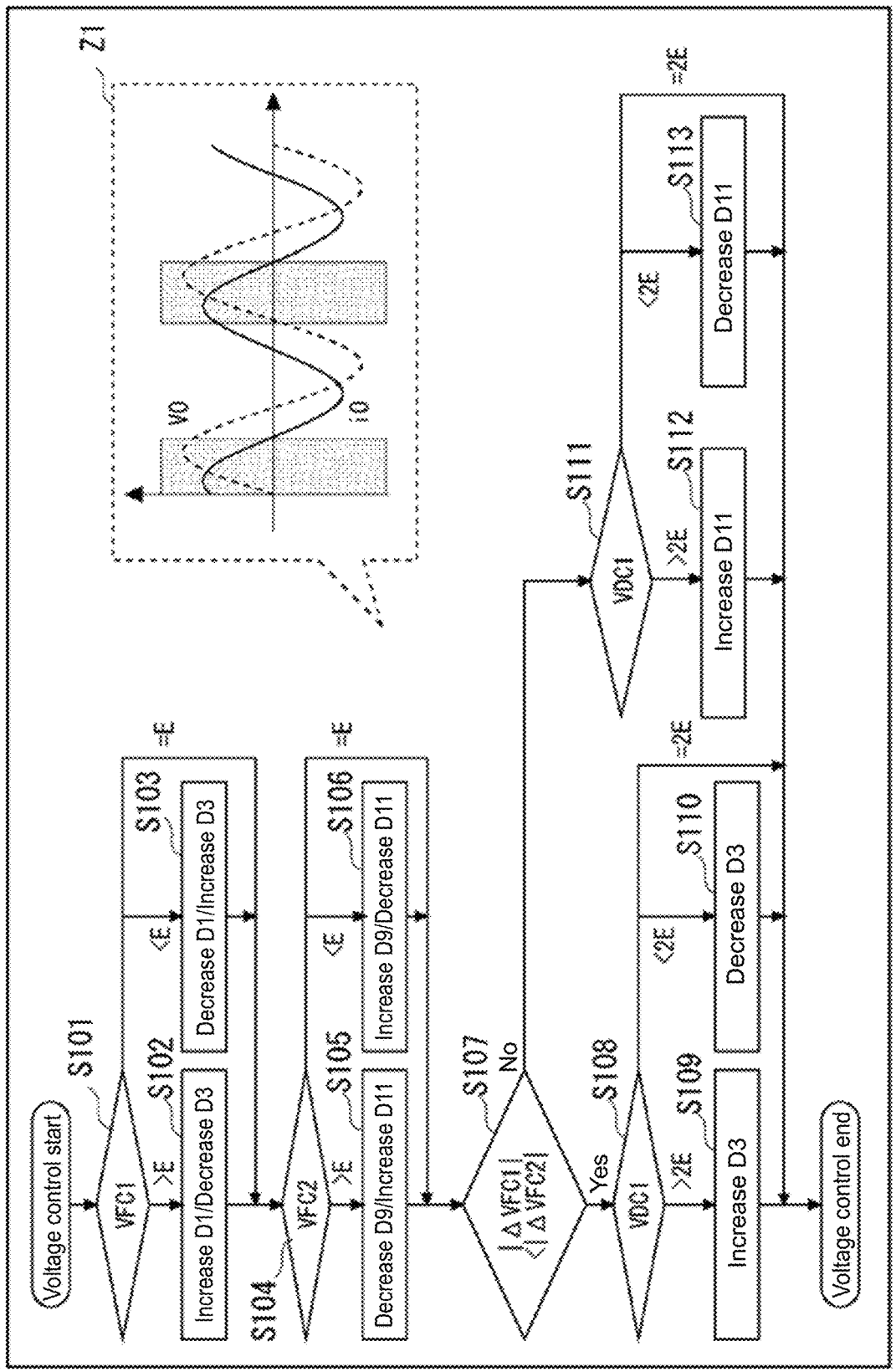
FIG. 11 is a flowchart showing an example voltage control process in the first embodiment of the present invention.

FIG. 11 is a flowchart showing an example voltage control process performed in the first region. An area Z1 indicated by a broken line in FIG. 11 shows, with hatched rectangles, example relative phase regions between the output voltage (vo) and the output current (io) to be controlled in this process. In the process in FIG. 11, after the voltage control process is started, the determination is performed as to whether the voltage value of the flying capacitor fc1 in the power conversion unit 10 is a constant value (E) (step S101). The controller 30 in the power converter 1 obtains the voltage value (VFC1) of the flying capacitor fc1 with a voltage sensor included in the first flying capacitor circuit 12. In step S101, when the voltage value (VFC1) of the flying capacitor fc1 is greater than the constant value (E) (>E in step S101), the processing advances to step S102. When the voltage value (VFC1) is less than the constant value (E) (<E in step S101), the processing advances to step S103. In step S101, when the voltage value (VFC1) of the flying capacitor fc1 is the constant value (E) (=E in step S101), the processing advances to step S104.

In step S102, the switching control of the first flying capacitor circuit 12 is performed to cause the voltage value (VFC1) of the flying capacitor fc1 to be the constant value (E). More specifically, as described with reference to FIG. 6, the duty cycle D1 identified with the on-off time of the switch S1 (S2 with overline) is increased, and the duty cycle D3 identified with the on-off time of the switch S3 (S4 with overline) is decreased. Such switching control relatively increases the discharge period of the flying capacitor fc1 and decreases the voltage value (VFC1) of the flying capacitor fc1 to the constant value (E). After step S102, the processing advances to step S104.

In step S103 as well, the switching control of the first flying capacitor circuit 12 is performed to cause the voltage value (VFC1) of the flying capacitor fc1 to be the constant value (E). More specifically, as described with reference to FIG. 6, the duty cycle D1 identified with the on-off time of the switch S1 (S2 with overline) is decreased, and the duty cycle D3 identified with the on-off time of the switch S3 (S4 with overline) is increased. Such switching control relatively decreases the discharge period of the flying capacitor fc1 and increases the voltage value (VFC1) of the flying capacitor fc1 to the constant value (E). After step S103, the processing advances to step S104.

In step S104, the determination is performed as to whether the voltage value of the flying capacitor fc2 is the constant value (E). In the same manner as in step S101, the voltage value (VFC2) of the flying capacitor fc2 is obtained with a voltage sensor included in the second flying capacitor circuit 13. When the voltage value (VFC2) of the flying capacitor fc2 is greater than the constant value (E) (>E in step S104), the processing advances to step S105. When the voltage value is less than the constant value (E) (<E in step S104), the processing advances to step S106. In step S104, when the voltage value (VFC2) of the flying capacitor fc2 is the constant value (E) (=E in step S104), the processing advances to step S107.

In step S105, the switching control of the second flying capacitor circuit 13 is performed to cause the voltage value (VFC2) of the flying capacitor fc2 to be the constant value (E). More specifically, the duty cycle D9 identified with the on-time of the switch S9 (S10 with overline) is decreased, and the duty cycle D11 identified with the on-time of the switch S11 (S12 with overline) is increased. In other words, with the positive polarity of the current in the first region, the charge-discharge relationship described with reference to FIG. 7 is opposite. Such switching control relatively increases the discharge period of the flying capacitor fc2 and decreases the voltage value (VFC2) of the flying capacitor fc2 to the constant value (E). After step S105, the processing advances to step S107.

In step S106 as well, the switching control of the second flying capacitor circuit 13 is performed to cause the voltage value (VFC2) of the flying capacitor fc2 to be the constant value (E). More specifically, the duty cycle D9 identified with the on-time of the switch S9 (S10 with overline) is increased, and the duty cycle D11 identified with the on-time of the switch S11 (S12 with overline) is decreased. Such switching control relatively decreases the discharge period of the flying capacitor fc2 and increases the voltage value (VFC2) of the flying capacitor fc2 to the constant value (E). After step S106, the processing advances to step S107.

In step S107, the switch to be operated to control the voltage (VDC1) of the first DC capacitor dc1 and the voltage (VDC2) of the second DC capacitor dc2 is determined based on the voltage (VFC1) of the flying capacitor fc1 and the voltage (VFC2) of the flying capacitor fc2. More specifically, the switch to be controlled is determined based on the sinusoidal voltage command value to generate AC power using potentials of five levels (4E, 2E, 0, −2E, and −4E) and the deviation of the voltage value of each flying capacitor from the voltage command value.

In step S107, the controller 30 determines the deviation (absolute value of the difference or |ΔVFC1|) of the voltage value (VFC1) obtained with the voltage sensor from the voltage command value for the flying capacitor fc1. Similarly, the controller 30 determines the deviation (absolute value of the difference or |ΔVFC2|) of the voltage value (VFC2) obtained with the voltage sensor from the voltage command value for the flying capacitor fc2. The greater one of the deviation (|ΔVFC1|) for the flying capacitor fc1 and the deviation (|ΔVFC2|) for the flying capacitor fc2 is then determined. When the deviation (|ΔVFC1|) for the flying capacitor fc1 is less than the deviation (|ΔVFC2|) for the flying capacitor fc2 (Yes in step S107), the processing advances to step S108. When the deviation (|ΔVFC1|) for the flying capacitor fc1 is greater than or equal to the deviation (|ΔVFC2|) for the flying capacitor fc2 (No in step S107), the processing advances to step S111.

In step S108, the determination is performed as to whether the voltage value of the first DC capacitor dc1 is a constant value (2E). The controller 30 in the power converter 1 obtains the voltage value (VDC1) of the first DC capacitor dc1 with a voltage sensor included in the first output circuit 14. When the voltage value (VDC1) of the first DC capacitor dc1 is greater than the constant value (2E) (>2E in step S108), the processing advances to step S109. When the voltage value (VDC1) is less than the constant value (2E) (<2E in step S108), the processing advances to step S110. In step S108, when the voltage value (VDC1) of the first DC capacitor dc1 is equal to the constant value (2E) (=2E in step S108), this routine ends temporarily.

In step S109, the switching control of the first flying capacitor circuit 12 is performed to cause the voltage value (VDC1) of the first DC capacitor dc1 to be the constant value (2E). More specifically, the duty cycle D3 identified with the on-time of the switch S3 (S4 with overline) is increased. Such switching control relatively decreases the discharge period of the second DC capacitor dc2 and decreases the voltage value (VDC1) of the first DC capacitor dc1 to the constant value (2E). After the processing in step S109, this routine ends temporarily.

In step S110 as well, the switching control of the first flying capacitor circuit 12 is performed to cause the voltage value (VDC1) of the first DC capacitor dc1 to be the constant value (2E). More specifically, the duty cycle D3 identified with the on-time of the switch S3 (S4 with overline) is decreased. Such switching control relatively increases the discharge period of the second DC capacitor dc2 and increases the voltage value (VDC1) of the first DC capacitor dc1 to the constant value (2E). After the processing in step S110, this routine ends temporarily.

In step S111 as well, the determination is performed as to whether the voltage value of the first DC capacitor dc1 is the constant value (2E). The controller 30 in the power converter 1 obtains, as in step S108, the voltage value (VDC1) of the first DC capacitor dc1 with the voltage sensor included in the first output circuit 14. When the voltage value (VDC1) of the first DC capacitor dc1 is greater than the constant value (2E) (>2E in step S111), the processing advances to step S112. When the voltage value (VDC1) is less than the constant value (2E) (<2E in step S111), the processing advances to step S113. In step S111, when the voltage value (VDC1) of the first DC capacitor dc1 is equal to the constant value (2E) (=2E in step S111), this routine ends temporarily.

In step S112, the switching control of the second flying capacitor circuit 13 is performed to cause the voltage value (VDC1) of the first DC capacitor dc1 to be the constant value (2E). More specifically, the duty cycle D11 identified with the on-time of the switch S11 (S12 with overline) is increased. Such switching control relatively decreases the discharge period of the second DC capacitor dc2 and decreases the voltage value (VDC1) of the first DC capacitor dc1 to the constant value (2E). After the processing in step S112, this routine ends temporarily.

In step S113 as well, the switching control of the second flying capacitor circuit 13 is performed to cause the voltage value (VDC1) of the first DC capacitor dc1 to be the constant value (2E). The duty cycle D11 identified with the on-time of the switch S11 (S12 with overline) is decreased. Such switching control relatively increases the discharge period of the second DC capacitor dc2 and increases the voltage value (VDC1) of the first DC capacitor dc1 to the constant value (2E). After the processing in step S113, this routine ends temporarily.

As described above, the power converter 1 according to the present embodiment increases the duty cycle D1 of the switch S1 (S2 with overline) and decreases the duty cycle D3 of the switch S3 (S4 with overline) when the voltage value (VFC1) of the flying capacitor fc1 is greater than the constant value (E). The above switching control of the switches increases the discharge period of the flying capacitor fc1 to decease the voltage value (VFC1) to the constant value (E).

The power converter 1 according to the present embodiment decreases the duty cycle D1 of the switch S1 (S2 with overline) and increases the duty cycle D3 of the switch S3 (S4 with overline) when the voltage value (VFC1) of the flying capacitor fc1 is less than the constant value (E). The above switching control of the switches decreases the discharge period of the flying capacitor fc1 to increase the voltage value (VFC1) to the constant value (E).

The power converter 1 according to the present embodiment decreases the duty cycle D9 of the switch S9 (S10 with overline) and increases the duty cycle D11 of the switch S11 (S12 with overline) when the voltage value (VFC2) of the flying capacitor fc2 is greater than the constant value (E). The above switching control of the switches increases the discharge period of the flying capacitor fc2 to decrease the voltage value (VFC2) to the constant value (E).

The power converter 1 according to the present embodiment increases the duty cycle D9 of the switch S9 (S10 with overline) and decreases the duty cycle D11 of the switch S11 (S12 with overline) when the voltage value (VFC2) of the flying capacitor fc2 is less than the constant value (E). The above switching control of the switches deceases the discharge period of the flying capacitor fc2 to increase the voltage value (VFC2) to the constant value (E).

The power converter 1 according to the present embodiment selects the switch for controlling the voltage (VDC1) of the first DC capacitor dc1 based on the deviation for the voltage (VFC1) of the flying capacitor fc1 and the deviation for the voltage (VFC2) of the flying capacitor fc2. When the deviation (|ΔVFC1|) for the flying capacitor fc1 is less than the deviation (|ΔVFC2|) for the flying capacitor fc2, the switch S3 (S4 with overline) is selected to control the voltage value (VDC1) of the first DC capacitor dc1 to be the constant value (2E). Similarly, when the deviation (|ΔVFC1|) for the flying capacitor fc1 is greater than or equal to the deviation (|ΔVFC2|) for the flying capacitor fc2, the switch S11 (S12 with overline) is selected to control the voltage value (VDC1) of the first DC capacitor dc1 to be the constant value (2E).

The power converter 1 according to the present embodiment increases the duty cycle D3 of the switch S3 (S4 with overline) when the voltage value (VDC1) of the first DC capacitor dc1 is greater than the constant value (2E) and decreases the duty cycle D3 when the voltage value (VDC1) is less than the constant value (2E). In the present embodiment, the voltage value (VDC1) of the first DC capacitor dc1 is controlled to be the constant value (2E) based on the duty cycle D3 of the switch S3 (S4 with overline).

The power converter 1 according to the present embodiment increases the duty cycle D11 of the switch S11 (S12 with overline) when the voltage value (VDC1) of the first DC capacitor dc1 is greater than the constant value (2E) and decreases the duty cycle D11 when the voltage value (VDC1) is less than the constant value (2E). This switching control also allows the voltage value (VDC1) of the first DC capacitor dc1 to be the constant value (2E) based on the duty cycle D11 of the switch S11 (S12 with overline).

(Second Region)

Figure 12:
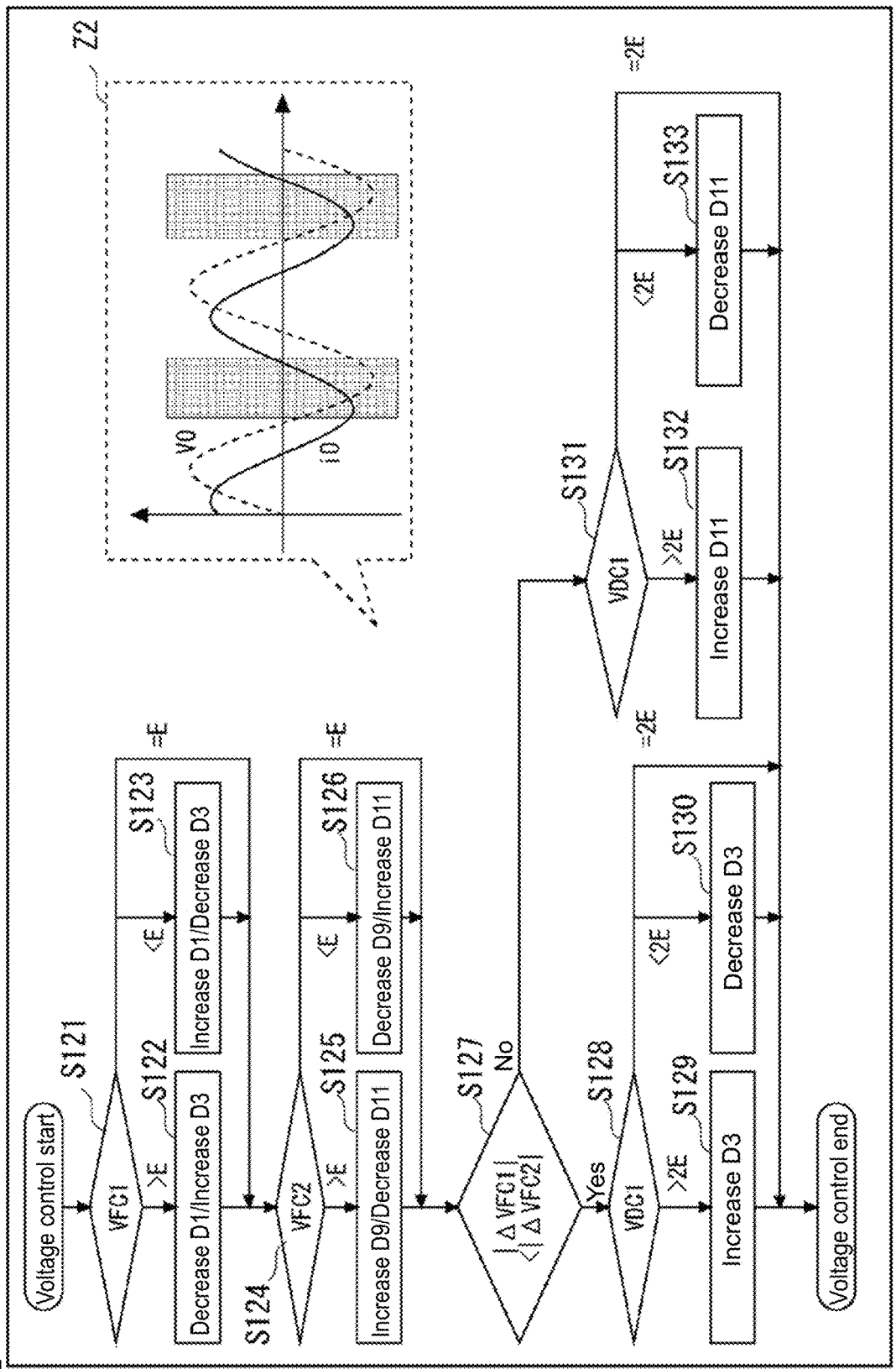
FIG. 12 is a flowchart showing an example voltage control process in the first embodiment of the present invention.

FIG. 12 is a flowchart showing an example voltage control process performed in the second region. An area Z2 indicated by a broken line in FIG. 12 shows, with hatched rectangles, example relative phase regions between the output voltage (vo) and the output current (io) to be controlled in this process. In the process in FIG. 12 as well, after the voltage control process is started, the determination is performed as to whether the voltage value of the flying capacitor fc1 in the power conversion unit 10 is the constant value (E) (step S121). The voltage value (VFC1) of the flying capacitor fc1 is obtained with a voltage sensor included in the first flying capacitor circuit 12. In step S121, when the voltage value (VFC1) of the flying capacitor fc1 is greater than the constant value (E) (>E in step S121), the processing advances to step S122. When the voltage value (VFC1) is less than the constant value (E) (<E in step S121), the processing advances to step S123. In step S121, when the voltage value (VFC1) of the flying capacitor fc1 is the constant value (E) (=E in step S121), the processing advances to step S124.

In step S122, the switching control of the first flying capacitor circuit 12 is performed to cause the voltage value (VFC1) of the flying capacitor fc1 to be the constant value (E). More specifically, as described with reference to FIG. 6, the duty cycle D1 identified with the on-time of the switch S1 (S2 with overline) is decreased, and the duty cycle D3 identified with the on-time of the switch S3 (S4 with overline) is increased. Such switching control relatively increases the discharge period of the flying capacitor fc1 and decreases the voltage value (VFC1) of the flying capacitor fc1 to the constant value (E). After step S122, the processing advances to step S124.

In step S123 as well, the switching control of the first flying capacitor circuit 12 is performed to cause the voltage value (VFC1) of the flying capacitor fc1 to be the constant value (E). More specifically, as described with reference to FIG. 6, the duty cycle D1 identified with the on-time of the switch S1 (S2 with overline) is increased, and the duty cycle D3 identified with the on-time of the switch S3 (S4 with overline) is decreased. Such switching control relatively decreases the discharge period of the flying capacitor fc1 and increases the voltage value (VFC1) of the flying capacitor fc1 to the constant value (E). After step S123, the processing advances to step S124.

In step S124, the determination is performed as to whether the voltage value of the flying capacitor fc2 is the constant value (E). The voltage value (VFC2) of the flying capacitor fc2 is obtained with the voltage sensor included in the second flying capacitor circuit 13. When the voltage value (VFC2) of the flying capacitor fc2 is greater than the constant value (E) (>E in step S124), the processing advances to step S125. When the voltage value (VFC2) is less than the constant value (E) (<E in step S124), the processing advances to step S126. In step S124, when the voltage value (VFC2) of the flying capacitor fc2 is the constant value (E) (=E in step S124), the processing advances to step S127.

In step S125, the switching control of the second flying capacitor circuit 13 is performed to cause the voltage value (VFC2) of the flying capacitor fc2 to be the constant value (E). More specifically, as described with reference to FIG. 7, the duty cycle D9 identified with the on-time of the switch S9 (S10 with overline) is increased, and the duty cycle D11 identified with the on-time of the switch S11 (S12 with overline) is decreased. Such switching control relatively increases the discharge period of the flying capacitor fc2 and decreases the voltage value (VFC2) of the flying capacitor fc2 to the constant value (E). After step S125, the processing advances to step S127.

In step S126 as well, the switching control of the second flying capacitor circuit 13 is performed to cause the voltage value (VFC2) of the flying capacitor fc2 to be the constant value (E). More specifically, as described with reference to FIG. 7, the duty cycle D9 identified with the on-time of the switch S9 (S10 with overline) is decreased, and the duty cycle D11 identified with the on-time of the switch S11 (S12 with overline) is increased. Such switching control relatively decreases the discharge period of the flying capacitor fc2 and increases the voltage value (VFC2) of the flying capacitor fc2 to the constant value (E). After step S126, the processing advances to step S127.

In the processing from step S127 to step S133, the processing from step S107 to step S113 shown in the flowchart in FIG. 11 is performed. In other words, the processing is performed to determine the deviation ($|\Delta VFC1|$) for the flying capacitor fc1 between the voltage command value and the voltage value (VFC1) obtained with the voltage sensor and the deviation ($|\Delta VFC2|$) for the flying capacitor fc2 between the voltage command value and the voltage value (VFC2) obtained with the voltage sensor. The greater one of the deviation ($|\Delta VFC1|$) for the flying capacitor fc1 and the deviation for the flying capacitor fc2 ($|\Delta VFC2|$) is then determined to determine the switch for controlling the voltage value of the first DC capacitor dc1 to be the constant value (2E).

When the deviation ($|\Delta VFC1|$) for the flying capacitor fc1 is less than the deviation for the flying capacitor fc2 ($|\Delta VFC2|$) (Yes in step S127), the switch S3 (S4 with overline) is selected to control the voltage value of the first DC capacitor dc1 to be the constant value (2E) (steps S128 to S130). When the deviation ($|\Delta VFC1|$) for the flying capacitor fc1 is greater than or equal to the deviation ($|\Delta VFC2|$) for the flying capacitor fc2 (No in step S127), the switch S11 (S12 with overline) is selected to control the voltage value of the first DC capacitor dc1 to be the constant value (2E) (steps S131 to S133). After step S133, this routine ends temporarily.

As described above, the power converter 1 according to the present embodiment decreases the duty cycle D1 of the switch S1 (S2 with overline) and increases the duty cycle D3 of the switch S3 (S4 with overline) when the voltage value (VFC1) of the flying capacitor fc1 is greater than the constant value (E). The above switching control of the switches relatively increases the discharge period of the flying capacitor fc1 to decrease the voltage value (VFC1) to the constant value (E).

The power converter 1 according to the present embodiment increases the duty cycle D1 of the switch S1 (S2 with overline) and decreases the duty cycle D3 of the switch S3 (S4 with overline) when the voltage value (VFC1) of the flying capacitor fc1 is less than the constant value (E). The above switching control of the switches decreases the discharge period of the flying capacitor fc1 to increase the voltage value (VFC1) to the constant value (E).

The power converter 1 according to the present embodiment increases the duty cycle D9 of the switch S9 (S10 with overline) and decreases the duty cycle D11 of the switch S11 (S12 with overline) when the voltage value (VFC2) of the flying capacitor fc2 is greater than the constant value (E). The above switching control of the switches increases the discharge period of the flying capacitor fc2 to decrease the voltage value (VFC2) to the constant value (E).

The power converter 1 according to the present embodiment decreases the duty cycle D9 of the switch S9 (S10 with overline) and increases the duty cycle D11 of the switch S11 (S12 with overline) when the voltage value (VFC2) of the flying capacitor fc2 is less than the constant value (E). The above switching control of the switches deceases the discharge period of the flying capacitor fc2 to increase the voltage value (VFC2) to the constant value (E).

For voltage control in the second region as well, the switch for controlling the voltage (VDC1) of the first DC capacitor dc1 is selected based on the deviation for the voltage (VFC1) of the flying capacitor fc1 and the deviation for the voltage (VFC2) of the flying capacitor fc2. When the deviation ($|\Delta VFC1|$) for the flying capacitor fc1 is less than the deviation ($|\Delta VFC2|$) for the flying capacitor fc2, the switch S3 (S4 with overline) is selected to control the voltage value (VDC1) of the first DC capacitor dc1 to be the constant value (2E). Similarly, when the deviation ($|\Delta VFC1|$) for the flying capacitor fc1 is greater than or equal to the deviation ($|\Delta VFC2|$) for the flying capacitor fc2, the switch S11 (S12 with overline) is selected to control the voltage value (VDC1) of the first DC capacitor dc1 to be the constant value (2E).

The power converter 1 according to the present embodiment increases the duty cycle D3 of the switch S3 (S4 with overline) when the voltage value (VDC1) of the first DC capacitor dc1 is greater than the constant value (2E) and decreases the duty cycle D3 when the voltage value (VDC1) is less than the constant value (2E). In the present embodiment, the voltage value (VDC1) of the first DC capacitor dc1 is controlled to be the constant value (2E) based on the duty cycle D3 of the switch S3 (S4 with overline).

The power converter 1 according to the present embodiment increases the duty cycle D11 of the switch S11 (S12 with overline) when the voltage value (VDC1) of the first DC capacitor dc1 is greater than the constant value (2E) and decreases the duty cycle D11 when the voltage value (VDC1) is less than the constant value (2E). This switching control also allows the voltage value (VDC1) of the first DC capacitor dc1 to be the constant value (2E) based on the duty cycle D11 of the switch S11 (S12 with overline).

(Third Region)

Figure 13:
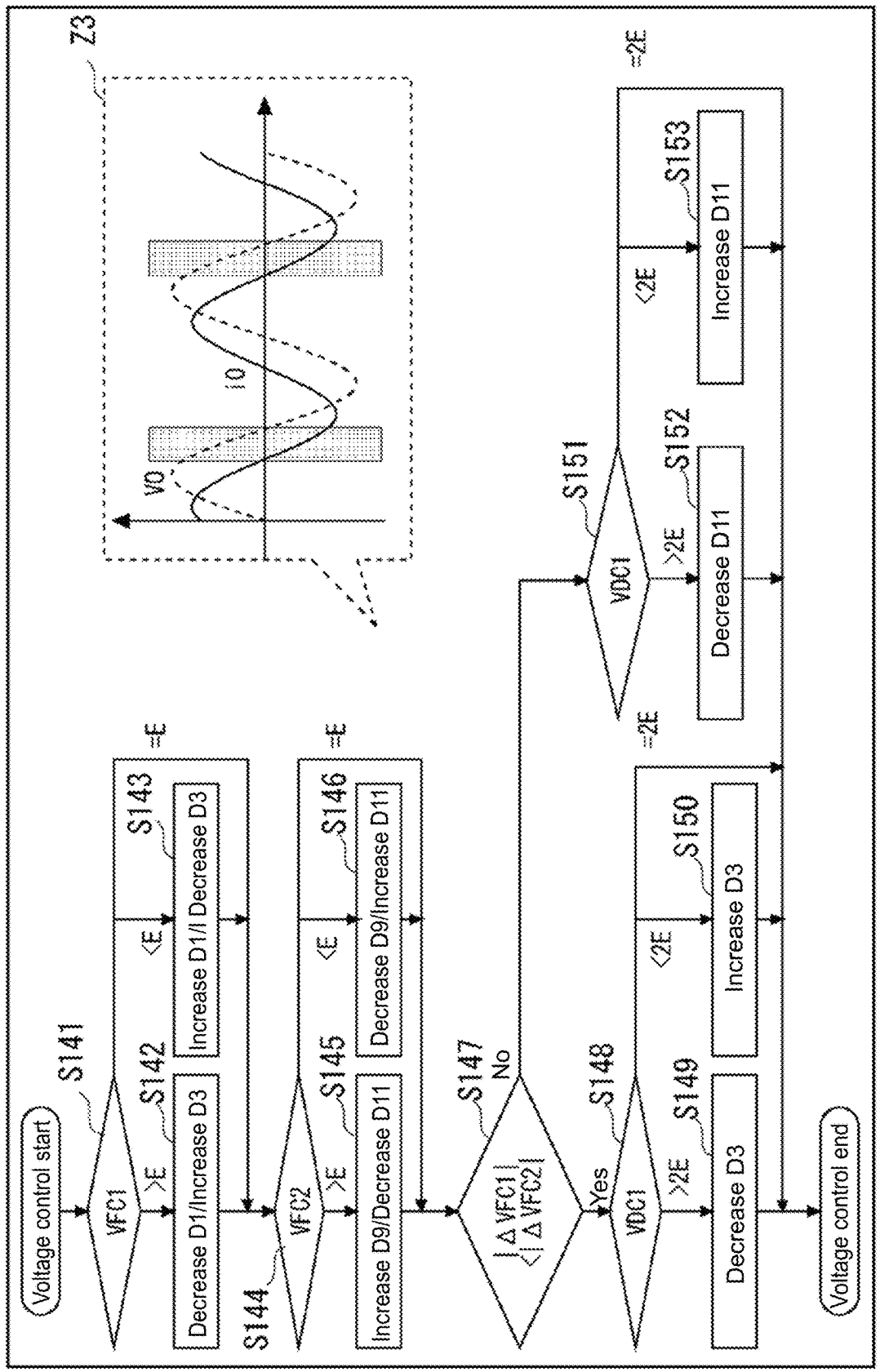
FIG. 13 is a flowchart showing an example voltage control process in the first embodiment of the present invention.

FIG. 13 is a flowchart showing an example voltage control process performed in the third region. An area Z3 indicated by a broken line in FIG. 13 shows, with hatched rectangles, example relative phase regions between the output voltage (vo) and the output current (io) to be controlled in this process. In the processing in steps S141 to S146 in the flowchart in FIG. 13 performed after the start of the voltage control process, the processing in steps S121 to S126 shown in the flowchart in FIG. 12 is performed.

In other words, when the voltage value (VFC1) of the flying capacitor fc1 is greater than the constant value (E) (>E in step S141), the duty cycle D1 of the switch S1 (S2 with overline) is decreased, and the duty cycle D3 of the switch S3 (S4 with overline) is increased (step S142). When the voltage value (VFC1) of the flying capacitor fc1 is less than the constant value (E) (<E in step S141), the duty cycle D1 of the switch S1 (S2 with overline) is increased, and the duty cycle D3 of the switch S3 (S4 with overline) is decreased (step S143). The processing in step S142 relatively increases the discharge period of the flying capacitor fc1 and decreases the voltage value (VFC1) of the flying capacitor fc1 to the constant value (E). The processing in step S143 relatively decreases the discharge period of the flying capacitor fc1 and increases the voltage value (VFC1) of the flying capacitor fc1 to the constant value (E).

When the voltage value (VFC2) of the flying capacitor fc2 is greater than the constant value (E) (>E in step S144), the duty cycle D9 of the switch S9 (S10 with overline) is increased, and the duty cycle D11 of the switch S11 (S12 with overline) is decreased (step S145). When the voltage value (VFC2) of the flying capacitor fc2 is less than the constant value (E) (<E in step S144), the duty cycle D9 of the switch S9 (S10 with overline) is decreased, and the duty cycle D11 of the switch S11 (S12 with overline) is increased (step S146). The processing in step S145 relatively increases the discharge period of the flying capacitor fc2 and decreases the voltage value (VFC2) of the flying capacitor fc2 to the constant value (E). The processing in step S146 relatively decreases the discharge period of the flying capacitor fc2 and increases the voltage value (VFC2) of the flying capacitor fc2 to the constant value (E). After step S146, the processing advances to step S147.

In step S147, the processing in step S107 shown in the flowchart in FIG. 11 is performed. In other words, the processing is performed to determine the deviation (|ΔVFC1|) for the flying capacitor fc1 between the voltage command value and the voltage value (VFC1) obtained with the voltage sensor and the deviation (|ΔVFC2|) for the flying capacitor fc2 between the voltage command value and the voltage value (VFC2) obtained with the voltage sensor. The greater one of the deviation (|ΔVFC1|) for the flying capacitor fc1 and the deviation for the flying capacitor fc2 (|ΔVFC2|) is then determined to determine the switch for controlling the voltage value of the first DC capacitor dc1 to be the constant value (2E).

In step S147, when the deviation (|ΔVFC1|) for the flying capacitor fc1 is less than the deviation (|ΔVFC2|) for the flying capacitor fc2 (Yes in step S147), the processing advances to step S148. When the deviation (|ΔVFC1|) for the flying capacitor fc1 is greater than or equal to the deviation (|ΔVFC2|) for the flying capacitor fc2 (No in step S147), the processing advances to step S151.

In step S148, the determination is performed as to whether the voltage value of the first DC capacitor dc1 is the constant value (2E). The voltage value (VDC1) of the first DC capacitor dc1 is obtained with the voltage sensor included in the first output circuit 14. When the voltage value (VDC1) of the first DC capacitor dc1 is greater than the constant value (2E) (>2E in step S148), the processing advances to step S149. When the voltage value (VDC1) is less than the constant value (2E) (<2E in step S148), the processing advances to step S150. In step S148, when the voltage value (VDC1) of the first DC capacitor dc1 is equal to the constant value (2E) (=2E in step S148), this routine ends temporarily.

In step S149, the switching control of the first flying capacitor circuit 12 is performed to cause the voltage value (VDC1) of the first DC capacitor dc1 to be the constant value (2E). More specifically, as described with reference to FIG. 8, the duty cycle D3 identified with the on-off time of the switch S3 (S4 with overline) is decreased. Such switching control relatively decreases the discharge period of the second DC capacitor dc2 and decreases the voltage value (VDC1) of the first DC capacitor dc1 to the constant value (2E). After step S149, this routine ends temporarily.

In step S150 as well, the switching control of the first flying capacitor circuit 12 is performed to cause the voltage value (VDC1) of the first DC capacitor dc1 to be the constant value (2E). More specifically, the duty cycle D3 identified with the on-time of the switch S3 (S4 with overline) is increased. Such switching control relatively increases the discharge period of the second DC capacitor dc2 and increases the voltage value (VDC1) of the first DC capacitor dc1 to the constant value (2E). After step S150, this routine ends temporarily.

In step S151, the determination is performed as to whether the voltage value of the first DC capacitor dc1 is the constant value (2E). The voltage value (VDC1) of the first DC capacitor dc1 is obtained with the voltage sensor included in the first output circuit 14. When the voltage value (VDC1) of the first DC capacitor dc1 is greater than the constant value (2E) (>2E in step S151), the processing advances to step S152. When the voltage value (VDC1) is less than the constant value (2E) (<2E in step S151), the processing advances to step S153. In step S151, when the voltage value (VDC1) of the first DC capacitor dc1 is equal to the constant value (2E) (=2E in step S151), this routine ends temporarily.

In step S152, the switching control of the second flying capacitor circuit 13 is performed to cause the voltage value (VDC1) of the first DC capacitor dc1 to be the constant value (2E). More specifically, the duty cycle D11 identified with the on-time of the switch S11 (S12 with overline) is decreased. Such switching control relatively decreases the discharge period of the second DC capacitor dc2 and decreases the voltage value (VDC1) of the first DC capacitor dc1 to the constant value (2E). After step S152, this routine ends temporarily.

In step S153 as well, the switching control of the second flying capacitor circuit 13 is performed to cause the voltage value (VDC1) of the first DC capacitor dc1 to be the constant value (2E). The duty cycle D11 identified with the on-time of the switch S11 (S12 with overline) is increased. Such switching control relatively increases the discharge period of the second DC capacitor dc2 and increases the voltage value (VDC1) of the first DC capacitor dc1 to the constant value (2E). After step S153, this routine ends temporarily.

As described above, the power converter 1 according to the present embodiment decreases, in the third region as well, the duty cycle D1 of the switch S1 (S2 with overline) and increases the duty cycle D3 of the switch S3 (S4 with overline) when the voltage value (VFC1) of the flying capacitor fc1 is greater than the constant value (E). This control relatively increases the discharge period of the flying capacitor fc1 to decrease the voltage value (VFC1) to the constant value (E). When the voltage value (VFC1) of the flying capacitor fc1 is less than the constant value (E), the duty cycle D1 of the switch S1 (S2 with overline) is increased, and the duty cycle D3 of the switch S3 (S4 with overline) is decreased. Such control relatively decreases the discharge period of the flying capacitor fc1 to increase the voltage value (VFC1) to the constant value (E).

In the third region as well, when the voltage value (VFC2) of the flying capacitor fc2 is greater than the constant value (E), the duty cycle D9 of the switch S9 (S10 with overline) is increased, and the duty cycle D11 of the switch S11 (S12 with overline) is decreased. The above switching control of the switches relatively increases the discharge period of the flying capacitor fc2 to decrease the voltage value (VFC2) to the constant value (E). When the voltage value (VFC2) of the flying capacitor fc2 is less than the constant value (E), the duty cycle D9 of the switch S9 (S10 with overline) is decreased and the duty cycle D11 of the switch S11 (S12 with overline) is increased. Such control relatively decreases the discharge period of the flying capacitor fc2 to increase the voltage value (VFC2) to the constant value (E).

For voltage control in the third region as well, the switch for controlling the voltage (VDC1) of the first DC capacitor dc1 is selected based on the deviation for the voltage (VFC1) of the flying capacitor fc1 and the deviation for the voltage (VFC2) of the flying capacitor fc2. When the deviation (|ΔVFC1|) for the flying capacitor fc1 is less than the deviation (|ΔVFC2|) for the flying capacitor fc2, the switch S3 (S4 with overline) is selected to control the voltage value (VDC1) of the first DC capacitor dc1 to be the constant value (2E). Similarly, when the deviation (|ΔVFC1|) for the flying capacitor fc1 is greater than or equal to the deviation (|ΔVFC2|) for the flying capacitor fc2, the switch S11 (S12 with overline) is selected to control the voltage value (VDC1) of the first DC capacitor dc1 to be the constant value (2E).

The power converter 1 according to the present embodiment decreases the duty cycle D3 of the switch S3 (S4 with overline) when the voltage value (VDC1) of the first DC capacitor dc1 is greater than the constant value (2E) and increases the duty cycle D3 when the voltage value (VDC1) is less than the constant value (2E). In the present embodiment, the voltage value (VDC1) of the first DC capacitor dc1 is controlled to be the constant value (2E) based on the duty cycle D3 of the switch S3 (S4 with overline).

The power converter 1 according to the present embodiment decreases the duty cycle D11 of the switch S11 (S12 with overline) when the voltage value (VDC1) of the first DC capacitor dc1 is greater than the constant value (2E) and increases the duty cycle D11 when the voltage value (VDC1) is less than the constant value (2E). This switching control also allows the voltage value (VDC1) of the first DC capacitor dc1 to be the constant value (2E) based on the duty cycle D11 of the switch S11 (S12 with overline).

(Fourth Region)

Figure 14:
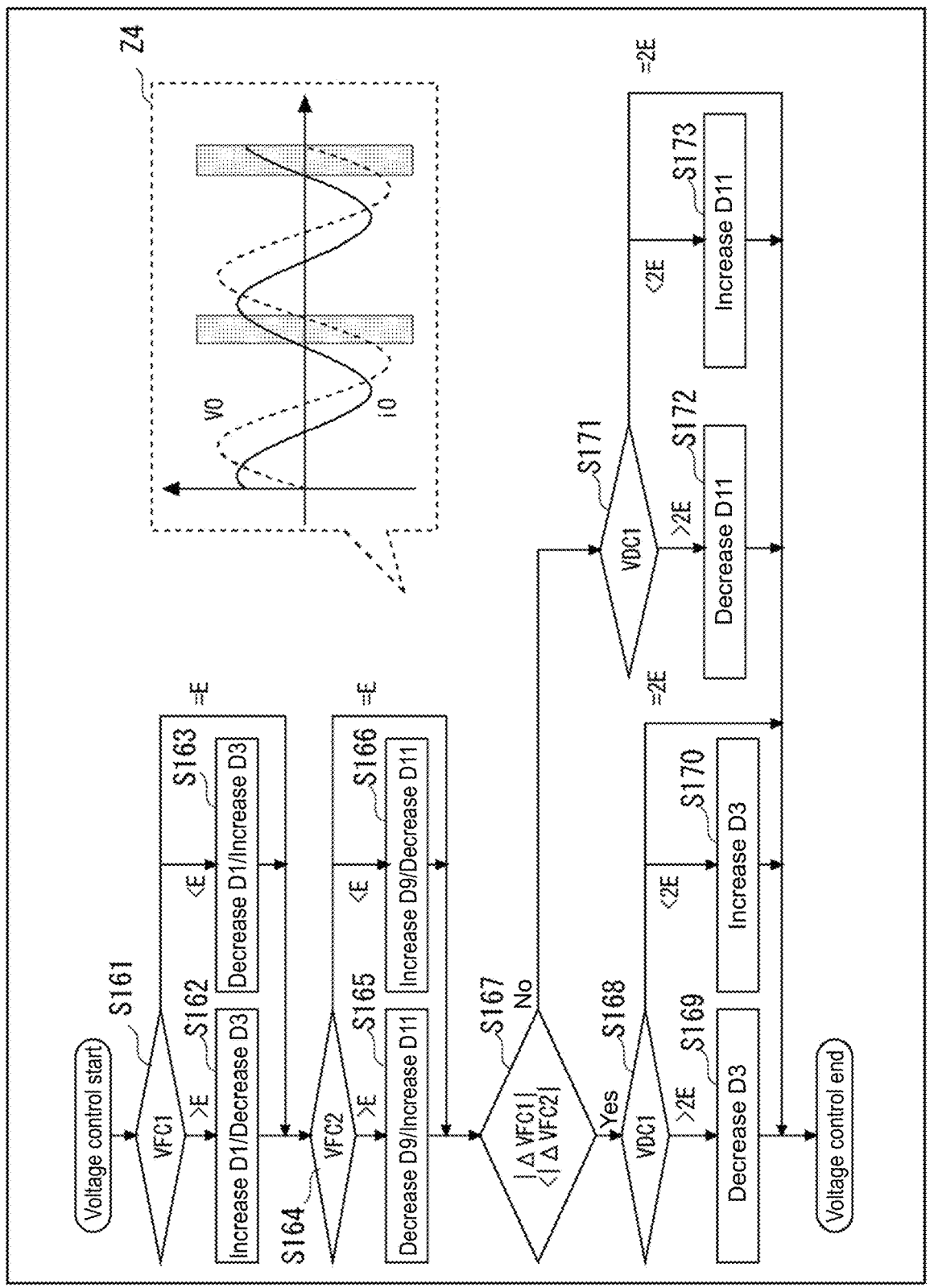
FIG. 14 is a flowchart showing an example voltage control process in the first embodiment of the present invention.

FIG. 14 is a flowchart showing an example voltage control process performed in the fourth region. An area Z4 indicated by a broken line in FIG. 14 shows, with hatched rectangles, example relative phase regions between the output voltage (vo) and the output current (io) to be controlled in this process. In the processing in steps S161 to S166 in the flowchart in FIG. 14 performed after the start of the voltage control process, the processing in steps S101 to S106 shown in the flowchart in FIG. 11 is performed.

In other words, when the voltage value (VFC1) of the flying capacitor fc1 is greater than the constant value (E) (>E in step S161), the duty cycle D1 of the switch S1 (S2 with overline) is increased, and the duty cycle D3 of the switch S3 (S4 with overline) is decreased (step S162). When the voltage value (VFC1) of the flying capacitor fc1 is less than the constant value (E) (<E in step S161), the duty cycle D1 of the switch S1 (S2 with overline) is decreased, and the duty cycle D3 of the switch S3 (S4 with overline) is increased (step S163). The processing in step S162 relatively increases the discharge period of the flying capacitor fc1 and decreases the voltage value (VFC1) of the flying capacitor fc1 to the constant value (E). The processing in step S163 relatively decreases the discharge period of the flying capacitor fc1 and increases the voltage value (VFC1) of the flying capacitor fc1 to the constant value (E).

When the voltage value (VFC2) of the flying capacitor fc2 is greater than the constant value (E) (>E in step S164), the duty cycle D9 of the switch S9 (S10 with overline) is decreased, and the duty cycle D11 of the switch S11 (S12 with overline) is increased (step S165). When the voltage value (VFC2) of the flying capacitor fc2 is less than the constant value (E) (<E in step S164), the duty cycle D9 of the switch S9 (S10 with overline) is increased, and the duty cycle D11 of the switch S11 (S12 with overline) is decreased (step S166). The processing in step S165 relatively increases the discharge period of the flying capacitor fc2 and decreases the voltage value (VFC2) of the flying capacitor fc2 to the constant value (E). The processing in step S166 relatively decreases the discharge period of the flying capacitor fc2 and increases the voltage value (VFC2) of the flying capacitor fc2 to the constant value (E). After step S166, the processing advances to step S167.

In the processing from step S167 to step S173, the processing from step S147 to step S153 shown in the flowchart in FIG. 13 is performed. In other words, the processing is performed to determine the deviation (|ΔVFC1|) for the flying capacitor fc1 between the voltage command value and the voltage value (VFC1) obtained with the voltage sensor and the deviation (|ΔVFC2|) for the flying capacitor fc2 between the voltage command value and the voltage value (VFC2) obtained with the voltage sensor. The greater one of the deviation (|ΔVFC1|) for the flying capacitor fc1 and the deviation for the flying capacitor fc2 (|ΔVFC2|) is then determined to determine the switch for controlling the voltage value of the first DC capacitor dc1 to be the constant value (2E).

When the deviation (|ΔVFC1|) for the flying capacitor fc1 is less than the deviation for the flying capacitor fc2 (|ΔVFC2|) (Yes in step S167), the switch S3 (S4 with overline) is selected to control the voltage value of the first DC capacitor dc1 to be the constant value (2E) (steps S168 to S170). When the deviation (|ΔVFC1|) for the flying capacitor fc1 is greater than or equal to the deviation (|ΔVFC2|) for the flying capacitor fc2 (No in step S167), the switch S11 (S12 with overline) is selected to control the voltage value of the first DC capacitor dc1 to be the constant value (2E) (steps S171 to S173). After step S173, this routine ends temporarily.

As described above, the power converter 1 according to the present embodiment increases, in the fourth region as well, the duty cycle D1 of the switch S1 (S2 with overline) and decreases the duty cycle D3 of the switch S3 (S4 with overline) when the voltage value (VFC1) of the flying capacitor fc1 is greater than the constant value (E). This control relatively increases the discharge period of the flying capacitor fc1 to decrease the voltage value (VFC1) to the constant value (E). When the voltage value (VFC1) of the flying capacitor fc1 is less than the constant value (E), the duty cycle D1 of the switch S1 (S2 with overline) is decreased, and the duty cycle D3 of the switch S3 (S4 with overline) is increased. Such control relatively decreases the discharge period of the flying capacitor fc1 to increase the voltage value (VFC1) to the constant value (E).

In the fourth region as well, when the voltage value (VFC2) of the flying capacitor fc2 is greater than the constant value (E), the duty cycle D9 of the switch S9 (S10 with overline) is decreased, and the duty cycle D11 of the switch S11 (S12 with overline) is increased. The above switching control of the switches relatively increases the discharge period of the flying capacitor fc2 to decrease the voltage value (VFC2) to the constant value (E). When the voltage value (VFC2) of the flying capacitor fc2 is less than the constant value (E), the duty cycle D9 of the switch S9 (S10 with overline) is increased, and the duty cycle D11 of the switch S11 (S12 with overline) is decreased. Such control relatively decreases the discharge period of the flying capacitor fc2 to increase the voltage value (VFC2) to the constant value (E).

For voltage control in the fourth region as well, the switch for controlling the voltage (VDC1) of the first DC capacitor dc1 is selected based on the deviation for the voltage (VFC1) of the flying capacitor fc1 and the deviation for the voltage (VFC2) of the flying capacitor fc2. When the deviation (|ΔVFC1|) for the flying capacitor fc1 is less than the deviation (|ΔVFC2|) for the flying capacitor fc2, the switch S3 (S4 with overline) is selected to control the voltage value (VDC1) of the first DC capacitor dc1 to be the constant value (2E). Similarly, when the deviation (|ΔVFC1|) for the flying capacitor fc1 is greater than or equal to the deviation (|ΔVFC2|) for the flying capacitor fc2, the switch S11 (S12 with overline) is selected to control the voltage value (VDC1) of the first DC capacitor dc1 to be the constant value (2E).

In the fourth region as well, the power converter 1 decreases the duty cycle D3 of the switch S3 (S4 with overline) when the voltage value (VDC1) of the first DC capacitor dc1 is greater than the constant value (2E) and increases the duty cycle D3 when the voltage value (VDC1) is less than the constant value (2E). In the present embodiment, the voltage value (VDC1) of the first DC capacitor dc1 is controlled to be the constant value (2E) based on the duty cycle D3 of the switch S3 (S4 with overline).

When the voltage value (VDC1) of the first DC capacitor dc1 is greater than the constant value (2E), the duty cycle D11 of the switch S11 (S12 with overline) is decreased. When the voltage value (VDC1) is less than the constant value (2E), the duty cycle D11 is increased. This switching control also allows the voltage value (VDC1) of the first DC capacitor dc1 to be the constant value (2E) based on the duty cycle D11 of the switch S11 (S12 with overline).

Figure 15:
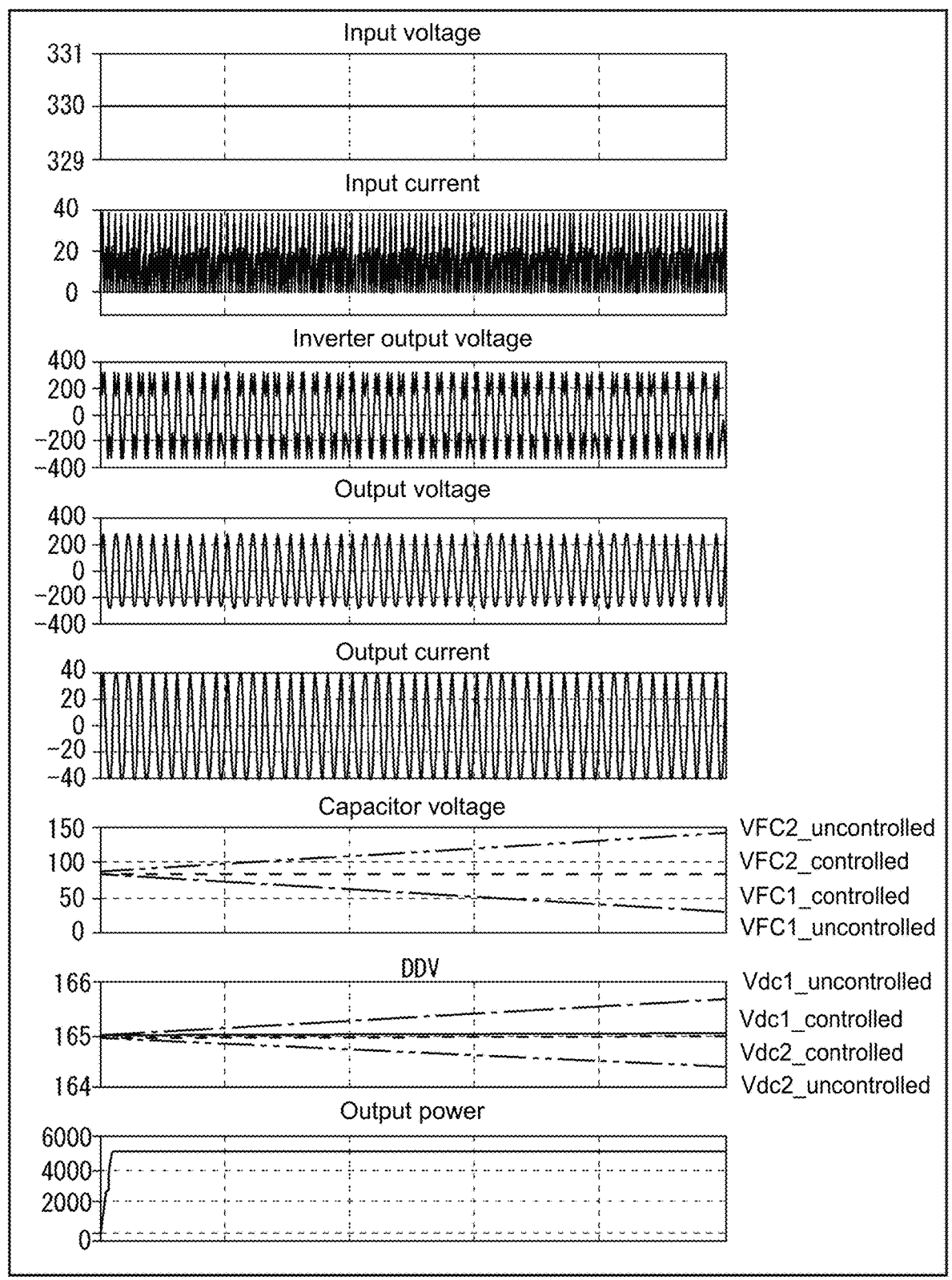
FIG. 15 is a diagram showing example simulation results of a control process in the first embodiment of the present invention.

FIG. 15 is a diagram showing the simulation results obtained with a voltage control method according to the present embodiment. The simulation conditions include an input voltage of 330 V, an output voltage of 202 V, an output power of 5500 W, an output frequency of 50 Hz, and a power factor of 1. The first row in FIG. 15 is a graph showing an example trend of the input voltage of a DC power supply V1 over time, and the second row is a graph showing an example trend of the input current of the DC power supply V1. Similarly, the third row is a graph showing an example trend of the inverter output voltage (voltage across the output terminal Tp3 and the output terminal Tp4). The fourth row is a graph showing an example trend of the voltage applied to the capacitor 20c. The fifth row is a graph showing an example trend of the output current (io). The sixth row is a graph showing example trends of the capacitor voltages (VFC1 and VFC2). The seventh row is a graph showing example trends of DDVs (VDC1 and VDC2). The eighth row is a graph showing an example trend of the output power.

As in the graph on the sixth row in FIG. 15, the voltages of the flying capacitor fc1 and the flying capacitor fc2 fluctuate over time, without the voltage control method according to the present embodiment. For example, the voltage value of the flying capacitor fc2 (VFC2_uncontrolled) increases over time from about 80 to 150 V as indicated by the two-dot-dash line. The voltage value of the flying capacitor fc1 (VFC1_uncontrolled) decreases over time from about 80 to 30 V as indicated by the dot-dash line. In contrast, with the voltage control method according to the present embodiment, the voltage values of the flying capacitor fc1 and the flying capacitor fc2 (VFC1_controlled and VFC2_controlled) remain at roughly a constant value as indicated by the broken lines.

As in the graph on the seventh row in FIG. 15, the voltages of the first DC capacitor dc1 and the second DC capacitor dc2 also fluctuate over time, without the voltage control method according to the present embodiment. For example, the voltage value of the first DC capacitor dc1 (Vdc1_uncontrolled) increases over time from about 165 to 166 V as indicated by the dot-dash line. The voltage value of the second DC capacitor dc2 (Vdc2_uncontrolled) decreases over time from about 165 to 164 V as indicated by the two-dot-dash line. In contrast, with the voltage control method according to the present embodiment, the voltage value of the second DC capacitor dc2 (Vdc2_controlled) remains at a constant value as indicated by the broken line. Similarly, the voltage value of the first DC capacitor dc1 (Vdc1_controlled) remains at a constant value as indicated by the solid line.

(Others)

The above embodiments are mere examples. The embodiments may be appropriately changed without departing from the spirit and scope of the disclosure. The processing or the units described herein may be combined in any manner unless such combinations cause technical conflicts between them.

A process performed by a single device may be performed by multiple devices in a shared manner. The processes performed by different devices may be performed by a single device. The computer system may flexibly change the hardware configuration to implement each function.

Computer-Readable Recording Medium

A program that causes an information processing device, or other machines or devices (hereafter referred to as computers), to implement any of the above functions may be recorded on a recording medium readable by computers. The computers can read and execute the program in the recording medium to provide the functions.

The computer-readable recording medium includes a recording medium storing information such as data and programs in an electrical, magnetic, optical, mechanical, or chemical manner for computers to read the information from the recording medium. Examples of such a recording medium removable from computers include a flexible disk, a magneto-optical disk, a compact disc read-only memory (CD-ROM), a compact disc-rewritable (CD-RW), a digital versatile disc (DVD), a Blu-ray disc, digital audio tape (DAT), 8 mm tape, a flash memory, and other memory cards. Examples of a recording media fixed to computers include hard disks and ROMs.

The elements in the aspects of the present invention below are identified with reference numerals used in the drawings to show the correspondence between these elements and the components in the embodiments.

<Aspect 1>

A power converter (1), comprising:
a controller (30); and
a power conversion unit (10) configured to cause, based on a control command from the controller (30), conduction or opening between a drain terminal and a source terminal of each of a plurality of switches and convert direct current power input into a first input terminal (Tp1) and a second input terminal (Tp2) to alternating current power to output the alternating current power from a first output terminal (Tp3) and a second output terminal (Tp4), the power conversion unit (10) including a direct current capacitor circuit (11) including a first direct current capacitor (dc1) and a second direct current capacitor (dc2) connected in series between the first input terminal (Tp1) and the second input terminal (Tp2), the first direct current capacitor (dc1) having an end connected to the first input terminal (Tp1), the second direct current capacitor (dc2) having an end connected to the second input terminal (Tp2), a first capacitor circuit (12) including a first switch (S3), a second switch (S1), a third switch (S2), and a fourth switch (S4) connected in series, the first capacitor circuit (12) including a first flying capacitor (fc1) having one end connected to a node between the source terminal of the first switch (S3) and the drain terminal of the second switch (S1) and another end connected to a node between the source terminal of the third switch (S2) and the drain terminal of the fourth switch (S4), a second capacitor circuit (13) including a fifth switch (S11), a sixth switch (S9), a seventh switch (S10), and an eighth switch (S12) connected in series, the second capacitor circuit (13) including a second flying capacitor (fc2) having one end connected to a node between the source terminal of the fifth switch (S11) and the drain terminal of the sixth switch (S9) and another end connected to a node between the source terminal of the seventh switch (S10) and the drain terminal of the eighth switch (S12), a first output circuit (14) including a ninth switch (S5), a tenth switch (S6), an eleventh switch (S7), and a twelfth switch (S8) connected in series between the first input terminal (Tp1) and the second input terminal (Tp2), the ninth switch (S5) including the drain terminal connected to the first input terminal (Tp1), the twelfth switch (S8) including the source terminal connected to the second input terminal (Tp2), and a second output circuit (15) including a thirteenth switch (S13), a fourteenth switch (S14), a fifteenth switch (S15), and a sixteenth switch (S16) connected in series between the first input terminal (Tp1) and the second input terminal (Tp2), the thirteenth switch (S13) including the drain terminal connected to the first input terminal (Tp1), the sixteenth switch (S16) including the source terminal connected to the second input terminal (Tp2), the first output circuit (14) including a node between the source terminal of the ninth switch (S5) and the drain terminal of the tenth switch (S6) connected to the drain terminal of the first switch (S3) in the first capacitor circuit (12), a node between the source terminal of the eleventh switch (S7) and the drain terminal of the twelfth switch (S8) connected to the source terminal of the fourth switch (S4) in the first capacitor circuit (12), and a node between the source terminal of the tenth switch (S6) and the drain terminal of the eleventh switch (S7) connected to a node between the first direct current capacitor (dc1) and the second direct current capacitor (dc2) in the direct current capacitor circuit (11), the second output circuit (15) including a node between the source terminal of the thirteenth switch (S13) and the drain terminal of the fourteenth switch (S14) connected to the drain terminal of the fifth switch (S11) in the second capacitor circuit (13), a node between the source terminal of the fifteenth switch (S15) and the drain terminal of the sixteenth switch (S16) connected to the source terminal of the eighth switch (S12) in the second capacitor circuit (13), and a node between the source terminal of the fourteenth switch (S14) and the drain terminal of the fifteenth switch (S15) connected to the node between the first direct current capacitor (dc1) and the second direct current capacitor (dc2) in the direct current capacitor circuit (11), the controller (30) being configured to increase or decrease a period for charging and discharging the first direct current capacitor (dc1) and the second direct current capacitor (dc2) based on a deviation of a detected voltage value of the first flying capacitor (fc1) from a voltage command value and a deviation of a detected voltage value of the second flying capacitor (fc2) from a voltage command value, and output alternating current power from the second output terminal (Tp4) connected to a node between the source terminal of the second switch (S1) and the drain terminal of the third switch (S2) in the first capacitor circuit (12) and from the first output terminal (Tp3) connected to a node between the source terminal of the sixth switch (S9) and the drain terminal of the seventh switch (S10) in the second capacitor circuit (13).

REFERENCE SIGNS LIST 1 power converter
10 power conversion unit
11 DC capacitor circuit
12 first flying capacitor circuit
13 second flying capacitor circuit
14 first output circuit
15 second output circuit
20 filter
30 controller
50 load
101 processor
102 main storage
103 auxiliary storage
104 communication I/F
105 input-output I/F
106 connection bus
dc1 first DC capacitor
dc2 second DC capacitor
fc1 flying capacitor (first flying capacitor)
fc2 flying capacitor (second flying capacitor)
S1, S2, S3, S4, S5, S6, S7, S8, S9, S10, S11, S12, S13, S14, S15, S16 switch
Tp1, Tp2 input terminal
Tp3, Tp4 output terminal
V1 DC power supply

The invention claimed is:

1. A power converter, comprising:
a controller; and
a power conversion unit configured to cause, based on a control command from the controller, conduction or opening between a drain terminal and a source terminal of each of a plurality of switches and convert direct current power input into a first input terminal and a second input terminal to alternating current power to output the alternating current power from a first output terminal and a second output terminal, the power conversion unit including a direct current capacitor circuit including a first direct current capacitor and a second direct current capacitor connected in series between the first input terminal and the second input terminal, the first direct current capacitor having an end connected to the first input terminal, the second direct current capacitor having an end connected to the second input terminal, a first capacitor circuit including a first switch, a second switch, a third switch, and a fourth switch connected in series, the first capacitor circuit including a first flying capacitor having one end connected to a node between the source terminal of the first switch and the drain terminal of the second switch and another end connected to a node between the source terminal of the third switch and the drain terminal of the fourth switch, a second capacitor circuit including a fifth switch, a sixth switch, a seventh switch, and an eighth switch connected in series, the second capacitor circuit including a second flying capacitor having one end connected to a node between the source terminal of the fifth switch and the drain terminal of the sixth switch and another end connected to a node between the source terminal of the seventh switch and the drain terminal of the eighth switch, a first output circuit including a ninth switch, a tenth switch, an eleventh switch, and a twelfth switch connected in series between the first input terminal and the second input terminal, the ninth switch including the drain terminal connected to the first input terminal, the twelfth switch including the source terminal connected to the second input terminal, and a second output circuit including a thirteenth switch, a fourteenth switch, a fifteenth switch, and a sixteenth switch connected in series between the first input terminal and the second input terminal, the thirteenth switch including the drain terminal connected to the first input terminal, the sixteenth switch including the source terminal connected to the second input terminal, the first output circuit including a node between the source terminal of the ninth switch and the drain terminal of the tenth switch connected to the drain terminal of the first switch in the first capacitor circuit, a node between the source terminal of the eleventh switch and the drain terminal of the twelfth switch connected to the source terminal of the fourth switch in the first capacitor circuit, and a node between the source terminal of the tenth switch and the drain terminal of the eleventh switch connected to a node between the first direct current capacitor and the second direct current capacitor in the direct current capacitor circuit, the second output circuit including a node between the source terminal of the thirteenth switch and the drain terminal of the fourteenth switch connected to the drain terminal of the fifth switch in the second capacitor circuit, a node between the source terminal of the fifteenth switch and the drain terminal of the sixteenth switch connected to the source terminal of the eighth switch in the second capacitor circuit, and a node between the source terminal of the fourteenth switch and the drain terminal of the fifteenth switch connected to the node between the first direct current capacitor and the second direct current capacitor in the direct current capacitor circuit, the controller being configured to increase or decrease a period for charging and discharging the first direct current capacitor and the second direct current capacitor based on a deviation of a detected voltage value of the first flying capacitor from a voltage command value and a deviation of a detected voltage value of the second flying capacitor from a voltage command value, and output alternating current power from the second output terminal connected to a node between the source terminal of the second switch and the drain terminal of the third switch in the first capacitor circuit and from the first output terminal connected to a node between the source terminal of the sixth switch and the drain terminal of the seventh switch in the second capacitor circuit.

2. The power converter according to claim 1, wherein when the alternating current power has a positive current polarity, the controller increases a closing period of the second switch and decreases a closing period of the first switch in the first capacitor circuit in response to the detected voltage value of the first flying capacitor being greater than a first voltage value, and decreases the closing period of the second switch and increases the closing period of the first switch in the first capacitor circuit in response to the detected voltage value of the first flying capacitor being less than the first voltage value.

3. The power converter according to claim 2, wherein when the alternating current power has a positive voltage polarity and a positive current polarity, and the deviation of the detected voltage value of the second flying capacitor from the voltage command value is greater than the deviation of the detected voltage value of the first flying capacitor from the voltage command value, the controller increases the closing period of the first switch in the first capacitor circuit in response to a detected voltage value of the first direct current capacitor being greater than a second voltage value, and decreases the closing period of the first switch in the first capacitor circuit in response to the detected voltage value of the first direct current capacitor being less than the second voltage value.

4. The power converter according to claim 2, wherein when the alternating current power has a positive voltage polarity and a positive current polarity, and the deviation of the detected voltage value of the second flying capacitor from the voltage command value is less than the deviation of the detected voltage value of the first flying capacitor from the voltage command value, the controller increases a closing period of the fifth switch in the second capacitor circuit in response to a detected voltage value of the first direct current capacitor being greater than a second voltage value, and decreases the closing period of the fifth switch in the second capacitor circuit in response to the detected voltage value of the first direct current capacitor being less than the second voltage value.

5. The power converter according to claim 2, wherein when the alternating current power has a negative voltage polarity and a positive current polarity, and the deviation of the detected voltage value of the second flying capacitor from the voltage command value is greater than the deviation of the detected voltage value of the first flying capacitor from the voltage command value, the controller decreases the closing period of the first switch in the first capacitor circuit in response to a detected voltage value of the first direct current capacitor being greater than a second voltage value, and increases the closing period of the first switch in the first capacitor circuit in response to the detected voltage value of the first direct current capacitor being less than the second voltage value.

6. The power converter according to claim 2, wherein when the alternating current power has a negative voltage polarity and a positive current polarity, and the deviation of the detected voltage value of the second flying capacitor from the voltage command value is less than the deviation of the detected voltage value of the first flying capacitor from the voltage command value, the controller decreases a closing period of the fifth switch in the second capacitor circuit in response to a detected voltage value of the first direct current capacitor being greater than a second voltage value, and increases the closing period of the fifth switch in the second capacitor circuit in response to the detected voltage value of the first direct current capacitor being less than the second voltage value.

7. The power converter according to claim 1, wherein when the alternating current power has a positive current polarity, the controller decreases a closing period of the sixth switch and increases a closing period of the fifth switch in the second capacitor circuit in response to the detected voltage value of the second flying capacitor being greater than a first voltage value, and increases the closing period of the sixth switch and decreases the closing period of the fifth switch in the second capacitor circuit in response to the detected voltage value of the second flying capacitor being less than the first voltage value.

8. The power converter according to claim 1, wherein when the alternating current power has a negative current polarity, the controller decreases a closing period of the second switch and increases a closing period of the first switch in the first capacitor circuit in response to the detected voltage value of the first flying capacitor being greater than a first voltage value, and increases the closing period of the second switch and decreases the closing period of the first switch in the first capacitor circuit in response to the detected voltage value of the first flying capacitor being less than the first voltage value.

9. The power converter according to claim 8, wherein when the alternating current power has a negative voltage polarity and a negative current polarity, and the deviation of the detected voltage value of the second flying capacitor from the voltage command value is greater than the deviation of the detected voltage value of the first flying capacitor from the voltage command value, the controller increases the closing period of the first switch in the first capacitor circuit in response to a detected voltage value of the first direct current capacitor being greater than a second voltage value, and decreases the closing period of the first switch in the first capacitor circuit in response to the detected voltage value of the first direct current capacitor being less than the second voltage value.

10. The power converter according to claim 8, wherein when the alternating current power has a negative voltage polarity and a negative current polarity, and the deviation of the detected voltage value of the second flying capacitor from the voltage command value is less than the deviation of the detected voltage value of the first flying capacitor from the voltage command value, the controller increases a closing period of the fifth switch in the second capacitor circuit in response to a detected voltage value of the first direct current capacitor being greater than a second voltage value, and decreases the closing period of the fifth switch in the second capacitor circuit in response to the detected voltage value of the first direct current capacitor being less than the second voltage value.

11. The power converter according to claim 8, wherein when the alternating current power has a positive voltage polarity and a negative current polarity, and the deviation of the detected voltage value of the second flying capacitor from the voltage command value is greater than the deviation of the detected voltage value of the first flying capacitor from the voltage command value, the controller decreases the closing period of the first switch in the first capacitor circuit in response to a detected voltage value of the first direct current capacitor being greater than a second voltage value, and increases the closing period of the first switch in the first capacitor circuit in response to the detected voltage value of the first direct current capacitor being less than the second voltage value.

12. The power converter according to claim 8, wherein when the alternating current power has a positive voltage polarity and a negative current polarity, and the deviation of the detected voltage value of the second flying capacitor from the voltage command value is less than the deviation of the detected voltage value of the first flying capacitor from the voltage command value, the controller decreases a closing period of the fifth switch in the second capacitor circuit in response to a detected voltage value of the first direct current capacitor being greater than a second voltage value, and increases the closing period of the fifth switch in the second capacitor circuit in response to the detected voltage value of the first direct current capacitor being less than the second voltage value.

13. The power converter according to claim 1, wherein when the alternating current power has a negative current polarity, the controller increases a closing period of the sixth switch and decreases a closing period of the fifth switch in the second capacitor circuit in response to the detected voltage value of the second flying capacitor being greater than a first voltage value, and decreases the closing period of the sixth switch and increases the closing period of the fifth switch in the second capacitor circuit in response to the detected voltage value of the second flying capacitor being less than the first voltage value.

14. A control method for a power converter, the power converter including a controller and a power conversion unit, the power conversion unit being configured to cause, based on a control command from the controller, conduction or opening between a drain terminal and a source terminal of each of a plurality of switches and convert direct current power input into a first input terminal and a second input terminal to alternating current power to output the alternating current power from a first output terminal and a second output terminal, the power conversion unit including
- a direct current capacitor circuit including a first direct current capacitor and a second direct current capacitor connected in series between the first input terminal and the second input terminal, the first direct current capacitor having an end connected to the first input terminal, the second direct current capacitor having an end connected to the second input terminal,
- a first capacitor circuit including a first switch, a second switch, a third switch, and a fourth switch connected in series, the first capacitor circuit including a first flying capacitor having one end connected to a node between the source terminal of the first switch and the drain terminal of the second switch and another end connected to a node between the source terminal of the third switch and the drain terminal of the fourth switch,
- a second capacitor circuit including a fifth switch, a sixth switch, a seventh switch, and an eighth switch connected in series, the second capacitor circuit including a second flying capacitor having one end connected to a node between the source terminal of the fifth switch and the drain terminal of the sixth switch and another end connected to a node between the source terminal of the seventh switch and the drain terminal of the eighth switch,
- a first output circuit including a ninth switch, a tenth switch, an eleventh switch, and a twelfth switch connected in series between the first input terminal and the second input terminal, the ninth switch including the drain terminal connected to the first input terminal, the twelfth switch including the source terminal connected to the second input terminal, and
- a second output circuit including a thirteenth switch, a fourteenth switch, a fifteenth switch, and a sixteenth switch connected in series between the first input terminal and the second input terminal, the thirteenth switch including the drain terminal connected to the first input terminal, the sixteenth switch including the source terminal connected to the second input terminal,
- the first output circuit including a node between the source terminal of the ninth switch and the drain terminal of the tenth switch connected to the drain terminal of the first switch in the first capacitor circuit, a node between the source terminal of the eleventh switch and the drain terminal of the twelfth switch connected to the source terminal of the fourth switch in the first capacitor circuit, and a node between the source terminal of the tenth switch and the drain terminal of the eleventh switch connected to a node between the first direct current capacitor and the second direct current capacitor in the direct current capacitor circuit,
- the second output circuit including a node between the source terminal of the thirteenth switch and the drain terminal of the fourteenth switch connected to the drain terminal of the fifth switch in the second capacitor circuit, a node between the source terminal of the fifteenth switch and the drain terminal of the sixteenth switch connected to the source terminal of the eighth switch in the second capacitor circuit, and a node between the source terminal of the fourteenth switch and the drain terminal of the fifteenth switch connected to the node between the first direct current capacitor and the second direct current capacitor in the direct current capacitor circuit,
- the control method comprising:
- increasing or decreasing, with the controller, a period for charging and discharging the first direct current capacitor and the second direct current capacitor based on a deviation of a detected voltage value of the first flying capacitor from a voltage command value and a deviation of a detected voltage value of the second flying capacitor from a voltage command value; and
- outputting, with the controller, alternating current power from the second output terminal connected to a node between the source terminal of the second switch and the drain terminal of the third switch in the first capacitor circuit and from the first output terminal connected to a node between the source terminal of the sixth switch and the drain terminal of the seventh switch in the second capacitor circuit.

* * * * *